(12) United States Patent
Shirley et al.

(10) Patent No.: US 12,650,066 B2
(45) Date of Patent: Jun. 9, 2026

(54) METHODS FOR PRODUCING HYDROCARBON FLUIDS WITH REDUCED WATER-OIL RATIO BY UTILIZING OIL-WET PETROLEUM COKE PROPPANT PARTICLES DURING HYDRAULIC FRACTURING

(71) Applicant: ExxonMobil Technology and Engineering Company, Spring, TX (US)

(72) Inventors: Robert M. Shirley, The Woodlands, TX (US); Xiao Jin, Kingwood, TX (US); Lee J. Hall, The Woodlands, TX (US); P. Matthew Spiecker, Manvel, TX (US); Jonathan M. Gieseke, Pinehurst, TX (US); Carlos A. Amaya, Calgary (CA)

(73) Assignee: ExxonMobil Technology and Engineering Company, Spring, TX (US)

( * ) Notice: Subject to any disclaimer, the term of this patent is extended or adjusted under 35 U.S.C. 154(b) by 0 days.

(21) Appl. No.: 18/675,624

(22) Filed: May 28, 2024

(65) Prior Publication Data

US 2025/0237128 A1 Jul. 24, 2025

Related U.S. Application Data

(63) Continuation-in-part of application No. 18/417,488, filed on Jan. 19, 2024, now abandoned, and a
(Continued)

(51) Int. Cl.
*E21B 43/267* (2006.01)
*C09K 8/80* (2006.01)

(52) U.S. Cl.
CPC ............ *E21B 43/267* (2013.01); *C09K 8/805* (2013.01)

(58) Field of Classification Search
CPC ....................................................... E21B 43/26
See application file for complete search history.

(56) References Cited

U.S. PATENT DOCUMENTS

| | | | |
|---|---|---|---|
| 1,754,765 A | 4/1930 | Parr et al. | |
| 3,089,542 A | 5/1963 | Kolodny | |
| (Continued) | | | |

FOREIGN PATENT DOCUMENTS

| | | |
|---|---|---|
| CA | 684454 A | 4/1964 |
| CA | 2863283 A1 | 3/2015 |
| (Continued) | | |

OTHER PUBLICATIONS

International Search Report and Written Opinion, dated Apr. 27, 2021 issued in related PCT Application No. PCT/US2021/015152, 12 pages.
(Continued)

*Primary Examiner* — William D Hutton, Jr.
*Assistant Examiner* — Avi T Skaist
(74) *Attorney, Agent, or Firm* — Troutman Pepper Locke LLP; John A. Morrissett; Scott A. Bergeson

(57) ABSTRACT

A method for producing hydrocarbon fluids via a hydrocarbon well comprises providing petroleum coke proppant particles having an Amott index for oil of at least 0.02, an Amott index for water of at most 0.1, and a pseudo Amott index of at most 0.35. The method also comprises, for each of a number of stages of the hydrocarbon well, introducing a fracturing fluid comprising a carrier fluid and the petroleum coke proppant particles into a subterranean formation via a wellbore of the hydrocarbon well and then producing hydrocarbon fluids from the subterranean formation via the wellbore of the hydrocarbon well.

25 Claims, 4 Drawing Sheets

300

302 — Produce Petroleum Coke Proppant Particles with Amott Index for Oil of at Least 0.02, Amott Index for Water of at Most 0.1, and Pseudo Amott Index of at Most 0.35

304 — For Each Stage of Hydrocarbon Well, Introduce Fracturing Fluid including Carrier Fluid and Petroleum Coke Proppant Particles into Subterranean Formation via Wellbore of Hydrocarbon Well 306 — Produce Hydrocarbon Fluids from Subterranean Formation via Wellbore, where Water-Oil Ratio of Produced Hydrocarbon Fluids is Decreased by at Least 5% as Compared to Expected Water-Oil Ratio of Produced Hydrocarbon Fluids if Fracturing Fluid did not include Petroleum Coke Proppant Particles

Related U.S. Application Data continuation-in-part of application No. 18/417,433, filed on Jan. 19, 2024, now abandoned, and a continuation-in-part of application No. 18/417,478, filed on Jan. 19, 2024, now abandoned, and a continuation-in-part of application No. 18/417,483, filed on Jan. 19, 2024, now abandoned, and a continuation-in-part of application No. 18/417,492, filed on Jan. 19, 2024, now abandoned.

(56) References Cited

U.S. PATENT DOCUMENTS

| | | |
|---|---|---|
| 3,283,817 A | 11/1966 | Roberts |
| 3,659,651 A | 5/1972 | Graham |
| 3,661,543 A | 5/1972 | Saxton |
| 3,664,420 A | 5/1972 | Graham et al. |
| 3,700,032 A | 10/1972 | Terry et al. |
| 3,702,516 A | 11/1972 | Luckenbach |
| 3,759,676 A | 9/1973 | Lahn |
| 3,816,084 A | 6/1974 | Moser et al. |
| 4,036,750 A | 7/1977 | Jaros et al. |
| 4,269,696 A | 5/1981 | Metrailer |
| 4,741,840 A | 5/1988 | Atherton et al. |
| 4,796,701 A | 1/1989 | Hudson et al. |
| 4,957,174 A | 9/1990 | Whitfill et al. |
| 5,189,102 A | 2/1993 | Tsubuko et al. |
| 5,215,143 A | 6/1993 | Gentry |
| 5,604,184 A | 2/1997 | Ellis et al. |
| 5,889,137 A | 3/1999 | Hutchings et al. |
| 5,899,272 A | 5/1999 | Loree |
| 6,016,879 A | 1/2000 | Burts, Jr. |
| 6,035,936 A | 3/2000 | Whalen |
| 6,059,034 A | 5/2000 | Rickards et al. |
| 6,283,212 B1 | 9/2001 | Hinkel et al. |
| 6,330,916 B1 | 12/2001 | Rickards et al. |
| 6,720,290 B2 | 4/2004 | England et al. |
| 6,825,152 B2 | 11/2004 | Green |
| 7,073,581 B2 | 7/2006 | Nguyen et al. |
| 7,210,528 B1 | 5/2007 | Brannon et al. |
| 7,237,609 B2 | 7/2007 | Nguyen |
| 7,249,500 B2 | 7/2007 | Dutton et al. |
| 7,255,169 B2 | 8/2007 | van Batenburg et al. |
| 7,270,879 B2 | 9/2007 | McCrary |
| 7,325,608 B2 | 2/2008 | van Batenburg et al. |
| 7,334,635 B2 | 2/2008 | Nguyen |
| 7,337,839 B2 | 3/2008 | Ayoub et al. |
| 7,424,911 B2 | 9/2008 | McCarthy et al. |
| 7,450,053 B2 | 11/2008 | Funk et al. |
| 7,472,751 B2 | 1/2009 | Brannon et al. |
| 7,494,711 B2 | 2/2009 | Kaufman et al. |
| 7,521,389 B2 | 4/2009 | Shmotev et al. |
| 7,527,097 B2 | 5/2009 | Patel |
| 7,528,096 B2 | 5/2009 | Brannon et al. |
| 7,541,318 B2 | 6/2009 | Weaver et al. |
| 7,568,524 B2 | 8/2009 | Blackburn et al. |
| 7,598,898 B1 | 10/2009 | Funk et al. |
| 7,612,021 B2 | 11/2009 | Chatterji et al. |
| 7,648,934 B2 | 1/2010 | Shmotev et al. |
| 7,669,657 B2 | 3/2010 | Symington et al. |
| 7,699,106 B2 | 4/2010 | Brannon et al. |
| 7,703,531 B2 | 4/2010 | Huang et al. |
| 7,721,803 B2 | 5/2010 | Huang et al. |
| 7,726,399 B2 | 6/2010 | Brannon et al. |
| 7,727,940 B2 | 6/2010 | Reddy et al. |
| 7,735,556 B2 | 6/2010 | Misselbrook et al. |
| 7,772,163 B1 | 8/2010 | Brannon et al. |
| 7,789,147 B2 | 9/2010 | Brannon et al. |
| 7,790,656 B2 | 9/2010 | Windebank et al. |
| 7,825,053 B2 | 11/2010 | Duenckel et al. |
| 7,833,947 B1 | 11/2010 | Kubala |
| 7,841,411 B2 | 11/2010 | Fuller et al. |
| 7,900,702 B2 | 3/2011 | Reddy et al. |
| 7,918,277 B2 | 4/2011 | Brannon et al. |
| 7,954,548 B2 | 6/2011 | Curimbaba et al. |
| 7,971,644 B2 | 7/2011 | Ladva et al. |
| 8,003,214 B2 | 8/2011 | Rediger et al. |
| 8,006,755 B2 | 8/2011 | Bicerano |
| 8,058,213 B2 | 11/2011 | Rediger et al. |
| 8,061,427 B2 | 11/2011 | Jackson et al. |
| 8,063,000 B2 | 11/2011 | Wilson |
| 8,082,994 B2 | 12/2011 | Nguyen et al. |
| 8,091,637 B2 | 1/2012 | Fripp |
| 8,104,537 B2 | 1/2012 | Kaminsky |
| 8,113,283 B2 | 2/2012 | Welton et al. |
| 8,127,844 B2 | 3/2012 | Luharuka et al. |
| 8,127,849 B2 | 3/2012 | Gupta |
| 8,127,850 B2 | 3/2012 | Brannon et al. |
| 8,167,043 B2 | 5/2012 | Willberg et al. |
| 8,178,477 B2 | 5/2012 | Skala et al. |
| 8,227,026 B2 | 7/2012 | McDaniel et al. |
| 8,236,737 B2 | 8/2012 | Fan et al. |
| 8,240,383 B2 | 8/2012 | Xu et al. |
| 8,281,857 B2 | 10/2012 | Willberg et al. |
| 8,291,978 B2 | 10/2012 | Hutchins et al. |
| 8,327,940 B2 | 12/2012 | Boronin et al. |
| 8,354,939 B2 | 1/2013 | McDaniel et al. |
| 8,360,149 B2 | 1/2013 | Hughes et al. |
| 8,361,373 B1 | 1/2013 | Byron |
| 8,420,578 B2 | 4/2013 | Usova et al. |
| 8,459,353 B2 | 6/2013 | Hughes et al. |
| 8,496,057 B2 | 7/2013 | Ferrero et al. |
| 8,540,024 B2 | 9/2013 | Kosarev et al. |
| 8,584,755 B2 | 11/2013 | Willberg et al. |
| 8,596,355 B2 | 12/2013 | Kaminsky et al. |
| 8,596,361 B2 | 12/2013 | Willberg et al. |
| 8,596,362 B2 | 12/2013 | Nelson |
| 8,603,578 B2 | 12/2013 | Smith et al. |
| 8,607,870 B2 | 12/2013 | Gu et al. |
| 8,613,314 B2 | 12/2013 | Garcia-Lopez de Victoria et al. |
| 8,614,157 B2 | 12/2013 | Pope et al. |
| 8,701,774 B2 | 4/2014 | Johnson, Sr. |
| 8,739,878 B2 | 6/2014 | Brannon et al. |
| 8,770,294 B2 | 7/2014 | Tanguay et al. |
| 8,772,207 B2 | 7/2014 | Geary et al. |
| 8,869,888 B2 | 10/2014 | Cramer et al. |
| 8,931,553 B2 | 1/2015 | Cannan et al. |
| 8,936,083 B2 | 1/2015 | Nguyen |
| 8,944,164 B2 | 2/2015 | Veldman et al. |
| 8,959,954 B2 | 2/2015 | Koseski et al. |
| 8,960,284 B2 | 2/2015 | Nguyen et al. |
| 8,978,764 B2 | 3/2015 | Dusseault et al. |
| 8,993,489 B2 | 3/2015 | McDaniel et al. |
| 9,010,424 B2 | 4/2015 | Agrawal et al. |
| 9,023,770 B2 | 5/2015 | Todd et al. |
| 9,080,441 B2 | 7/2015 | Meurer et al. |
| 9,091,161 B2 | 7/2015 | Brannon |
| 9,096,790 B2 | 8/2015 | Mccrary et al. |
| 9,097,097 B2 | 8/2015 | DiFoggio et al. |
| 9,102,867 B2 | 8/2015 | Parse et al. |
| 9,109,992 B2 | 8/2015 | Wang |
| 9,140,118 B2 | 9/2015 | Kulkarni et al. |
| 9,145,513 B2 | 9/2015 | Pershikova et al. |
| 9,175,210 B2 | 11/2015 | Eldred et al. |
| 9,175,529 B2 | 11/2015 | Jamison et al. |
| 9,228,041 B2 | 1/2016 | Martinez-Castro et al. |
| 9,234,127 B2 | 1/2016 | De Paiva Cortes et al. |
| 9,234,415 B2 | 1/2016 | Hughes et al. |
| 9,243,491 B2 | 1/2016 | McDaniel et al. |
| 9,290,689 B2 | 3/2016 | Lafitte et al. |
| 9,291,045 B2 | 3/2016 | Wheeler et al. |
| 9,315,719 B2 | 4/2016 | Fang et al. |
| 9,322,269 B2 | 4/2016 | Matherly et al. |
| 9,353,613 B2 | 5/2016 | Soliman et al. |
| 9,388,334 B2 | 7/2016 | Hughes et al. |
| 9,458,710 B2 | 10/2016 | Makarychev-Mikhailov et al. |
| 9,523,268 B2 | 12/2016 | Potapenko et al. |
| 9,556,376 B2 | 1/2017 | Huang et al. |
| 9,574,130 B2 | 2/2017 | Gupta |
| 9,611,423 B2 | 4/2017 | Zhang et al. |
| 9,631,137 B2 | 4/2017 | Fuss et al. |
| 9,638,016 B2 | 5/2017 | Horvath Szabo et al. |
| 9,643,774 B2 | 5/2017 | Oren |
| 9,650,881 B2 | 5/2017 | Clem |
| 9,657,219 B2 | 5/2017 | Rodriguez |

(56) References Cited

U.S. PATENT DOCUMENTS

| | | |
|---|---|---|
| 9,670,400 B2 | 6/2017 | Eldred et al. |
| 9,670,762 B2 | 6/2017 | Nguyen et al. |
| 9,670,763 B2 | 6/2017 | Fang et al. |
| 9,670,764 B2 | 6/2017 | Lesko et al. |
| 9,688,905 B2 | 6/2017 | Nguyen et al. |
| 9,701,589 B2 | 7/2017 | Schofalvi |
| 9,715,026 B2 | 7/2017 | Ejofodomi et al. |
| 9,719,011 B2 | 8/2017 | Tanguay et al. |
| 9,732,269 B2 | 8/2017 | Bicerano |
| 9,732,561 B2 | 8/2017 | Carter, Jr. |
| 9,739,122 B2 | 8/2017 | Symington et al. |
| 9,745,841 B2 | 8/2017 | Marino et al. |
| 9,783,727 B2 | 10/2017 | Lahman et al. |
| 9,790,422 B2 | 10/2017 | McDaniel |
| 9,803,135 B2 | 10/2017 | Barron et al. |
| 9,816,364 B2 | 11/2017 | Kruspe et al. |
| 9,845,427 B2 | 12/2017 | Soane et al. |
| 9,845,428 B2 | 12/2017 | Soane et al. |
| 9,850,748 B2 | 12/2017 | Nguyen et al. |
| 9,862,879 B2 | 1/2018 | Chatterjee et al. |
| 9,879,175 B2 | 1/2018 | Aines et al. |
| 9,896,618 B2 | 2/2018 | Huang et al. |
| 9,896,619 B2 | 2/2018 | Nguyen et al. |
| 9,902,899 B2 | 2/2018 | Parse et al. |
| 9,914,872 B2 | 3/2018 | Wehunt et al. |
| 9,920,607 B2 | 3/2018 | Brannon et al. |
| 9,920,610 B2 | 3/2018 | Nelson et al. |
| 9,932,521 B2 | 4/2018 | Soane et al. |
| 9,938,454 B2 | 4/2018 | Tanguay et al. |
| 9,938,811 B2 | 4/2018 | Bestaoui-Spurr et al. |
| 9,944,845 B2 | 4/2018 | Tanguay et al. |
| 9,957,440 B2 | 5/2018 | Nguyen et al. |
| 9,995,125 B2 | 6/2018 | Madasu et al. |
| 10,001,003 B2 | 6/2018 | Dusseault et al. |
| 10,001,769 B2 | 6/2018 | Huang et al. |
| 10,011,763 B2 | 7/2018 | Hartman et al. |
| 10,017,688 B1 | 7/2018 | Green et al. |
| 10,023,791 B1 | 7/2018 | Corcoran et al. |
| 10,060,244 B2 | 8/2018 | Nguyen et al. |
| 10,081,758 B2 | 9/2018 | Dreyer et al. |
| 10,082,013 B2 | 9/2018 | Nguyen et al. |
| 10,087,735 B2 | 10/2018 | Brannon |
| 10,093,849 B2 | 10/2018 | Windebank et al. |
| 10,106,728 B2 | 10/2018 | Dusterhoft et al. |
| 10,106,732 B2 | 10/2018 | Cannan et al. |
| 10,113,106 B2 | 10/2018 | Wadekar |
| 10,113,406 B1 | 10/2018 | Gomaa et al. |
| 10,138,415 B2 | 11/2018 | Bryant et al. |
| 10,150,907 B2 | 12/2018 | Weaver et al. |
| 10,202,836 B2 | 2/2019 | Veldman et al. |
| 10,208,243 B2 | 2/2019 | Burks et al. |
| 10,214,682 B2 | 2/2019 | Nguyen et al. |
| 10,221,660 B2 | 3/2019 | Moeller et al. |
| 10,227,525 B2 | 3/2019 | Monroe et al. |
| 10,233,386 B2 | 3/2019 | Chatterjee et al. |
| 10,240,447 B2 | 3/2019 | Gupta et al. |
| 10,253,250 B2 | 4/2019 | Nguyen et al. |
| 10,266,758 B2 | 4/2019 | Rediger |
| 10,267,133 B2 | 4/2019 | Gullickson et al. |
| 10,267,134 B2 | 4/2019 | Cannan et al. |
| 10,280,363 B2 | 5/2019 | Suzart et al. |
| 10,287,482 B2 | 5/2019 | Ferm et al. |
| 10,287,867 B2 | 5/2019 | Nguyen et al. |
| 10,301,920 B2 | 5/2019 | Green et al. |
| 10,352,145 B2 | 7/2019 | Maxwell et al. |
| 10,364,660 B2 | 7/2019 | Nguyen et al. |
| 10,369,724 B2 | 8/2019 | Ortega Andrade et al. |
| 10,370,586 B2 | 8/2019 | Fitzgerald et al. |
| 10,370,950 B2 | 8/2019 | Gupta et al. |
| 10,400,054 B2 | 9/2019 | Viswanath et al. |
| 10,421,897 B2 | 9/2019 | Skiba et al. |
| 10,428,266 B2 | 10/2019 | Nguyen et al. |
| 10,428,267 B2 | 10/2019 | Cannan et al. |
| 10,457,855 B2 | 10/2019 | Mahmoud et al. |
| 10,457,859 B2 | 10/2019 | Robl et al. |
| 10,458,220 B2 | 10/2019 | Switzer et al. |
| 10,479,704 B2 | 11/2019 | Hayes et al. |
| 10,479,929 B2 | 11/2019 | Gupta |
| 10,519,361 B2 | 12/2019 | Wadekar et al. |
| 10,519,364 B2 | 12/2019 | Stephens et al. |
| 10,538,696 B2 | 1/2020 | Allen et al. |
| 10,538,697 B2 | 1/2020 | Nguyen et al. |
| 10,557,335 B2 | 2/2020 | Potapenko et al. |
| 10,590,265 B2 | 3/2020 | Yalcin et al. |
| 10,590,324 B2 | 3/2020 | Kulkarni et al. |
| 10,590,763 B2 | 3/2020 | Sen et al. |
| 10,611,954 B2 | 4/2020 | Ramos et al. |
| 10,640,388 B2 | 5/2020 | Akbar et al. |
| 10,640,701 B2 | 5/2020 | Montalvo et al. |
| 10,647,907 B2 | 5/2020 | Nguyen et al. |
| 10,647,908 B2 | 5/2020 | Favero |
| 10,647,910 B1 | 5/2020 | Nguyen et al. |
| 10,655,408 B2 | 5/2020 | Goloshchapova |
| 10,655,443 B2 | 5/2020 | Gomaa et al. |
| 10,655,444 B2 | 5/2020 | Nguyen et al. |
| 10,655,466 B2 | 5/2020 | Kabannik |
| 10,661,981 B2 | 5/2020 | Oren et al. |
| 10,689,972 B1 | 6/2020 | Zhao et al. |
| 10,711,564 B2 | 7/2020 | Dusterhoft et al. |
| 10,723,938 B2 | 7/2020 | Johnson, Sr. |
| 10,738,581 B2 | 8/2020 | Nguyen et al. |
| 10,738,582 B2 | 8/2020 | Nguyen et al. |
| 10,738,584 B2 | 8/2020 | Nguyen et al. |
| 10,745,611 B2 | 8/2020 | Nguyen et al. |
| 10,752,828 B2 | 8/2020 | Gomaa et al. |
| 10,767,101 B2 | 9/2020 | Kovalchuk et al. |
| 10,767,104 B2 | 9/2020 | Do et al. |
| 10,793,768 B2 | 10/2020 | Patel et al. |
| 10,801,307 B2 | 10/2020 | Roussel et al. |
| 10,808,167 B2 | 10/2020 | Beuterbaugh et al. |
| 10,808,168 B2 | 10/2020 | Montenegro Galindo et al. |
| 10,808,497 B2 | 10/2020 | Potapenko et al. |
| 10,808,515 B1 | 10/2020 | Sierra et al. |
| 10,815,420 B2 | 10/2020 | Shroff Rama et al. |
| 10,823,646 B1 | 11/2020 | Guo et al. |
| 10,844,280 B2 | 11/2020 | Goyal et al. |
| 10,851,283 B2 | 12/2020 | Potapenko et al. |
| 10,870,792 B2 | 12/2020 | Reyes et al. |
| 10,876,044 B2 | 12/2020 | Salla et al. |
| 10,882,751 B2 | 1/2021 | Shahsavari et al. |
| 10,900,339 B2 | 1/2021 | Schipper et al. |
| 10,914,139 B2 | 2/2021 | Shahri et al. |
| 10,920,130 B2 | 2/2021 | Nguyen et al. |
| 10,920,558 B2 | 2/2021 | Nguyen et al. |
| 10,934,476 B1 | 3/2021 | Kamavaram et al. |
| 10,941,336 B2 | 3/2021 | Pantsurkin et al. |
| 10,947,447 B2 | 3/2021 | Hendrickson et al. |
| 10,954,430 B2 | 3/2021 | Plishka et al. |
| 10,954,431 B2 | 3/2021 | Chittattukara et al. |
| 10,954,768 B2 | 3/2021 | Gullickson et al. |
| 10,961,444 B1 | 3/2021 | Bestaoui-Spurr et al. |
| 10,975,295 B2 | 4/2021 | Cannan et al. |
| 10,984,156 B2 | 4/2021 | Wu et al. |
| 10,988,674 B2 | 4/2021 | Nguyen et al. |
| 10,988,679 B2 | 4/2021 | Calvin |
| 10,989,034 B2 | 4/2021 | Lin et al. |
| 11,008,506 B2 | 5/2021 | Nguyen et al. |
| 11,008,845 B2 | 5/2021 | Singh et al. |
| 11,015,437 B2 | 5/2021 | Zhang et al. |
| 11,021,649 B2 | 6/2021 | Bai et al. |
| 11,028,318 B2 | 6/2021 | Cannan et al. |
| 11,078,409 B2 | 8/2021 | Allison |
| 11,104,841 B2 | 8/2021 | Hill et al. |
| 11,111,766 B2 | 9/2021 | Brannon et al. |
| 11,124,696 B2 | 9/2021 | Khamatnurova et al. |
| 11,125,068 B2 | 9/2021 | Jiang et al. |
| 11,142,680 B2 | 10/2021 | Dreyer et al. |
| 11,155,751 B2 | 10/2021 | Bestaoui-Spurr et al. |
| 11,162,022 B2 | 11/2021 | Cannan et al. |
| 11,162,347 B2 | 11/2021 | Yu et al. |
| 11,180,691 B2 | 11/2021 | Sodhi et al. |
| 11,230,660 B2 | 1/2022 | Nguyen et al. |
| 11,236,599 B2 | 2/2022 | Nguyen et al. |
| 11,254,857 B2 | 2/2022 | Cox et al. |

(56) References Cited

U.S. PATENT DOCUMENTS

| | | |
|---|---|---|
| 11,255,176 B2 | 2/2022 | Nguyen et al. |
| 11,274,243 B2 | 3/2022 | Siddiqui et al. |
| 11,280,172 B2 | 3/2022 | Peng et al. |
| 11,313,211 B2 | 4/2022 | Johnson |
| 11,313,214 B2 | 4/2022 | Nguyen et al. |
| 11,319,482 B2 | 5/2022 | Rahy et al. |
| 11,326,088 B2 | 5/2022 | Todd |
| 11,339,323 B2 | 5/2022 | Roper et al. |
| 11,345,848 B2 | 5/2022 | Khamatnurova et al. |
| 11,352,551 B2 | 6/2022 | Agrawal et al. |
| 11,365,341 B2 | 6/2022 | Patil et al. |
| 11,377,581 B2 | 7/2022 | Belakshe et al. |
| 11,377,944 B2 | 7/2022 | Santra et al. |
| 11,396,800 B2 | 7/2022 | Madasu et al. |
| 11,407,932 B2 | 8/2022 | Deysarkar et al. |
| 11,408,281 B2 | 8/2022 | Lu et al. |
| 11,414,974 B2 | 8/2022 | Entchev et al. |
| 11,427,753 B2 | 8/2022 | Ortega Andrade et al. |
| 11,428,087 B2 | 8/2022 | Nguyen et al. |
| 11,428,839 B2 | 8/2022 | Mukherjee |
| 11,434,740 B1 | 9/2022 | Nguyen et al. |
| 11,441,406 B2 | 9/2022 | Nguyen et al. |
| 11,447,690 B2 | 9/2022 | Nguyen et al. |
| 11,447,693 B2 | 9/2022 | Jenkins et al. |
| 11,459,500 B2 | 10/2022 | Khamatnurova et al. |
| 11,465,155 B1 | 10/2022 | Mitchell et al. |
| 11,466,201 B2 | 10/2022 | Smith, Jr. et al. |
| 11,485,901 B2 | 11/2022 | Shen et al. |
| 11,486,241 B2 | 11/2022 | Nelson et al. |
| 11,492,543 B2 | 11/2022 | Gordon et al. |
| 11,506,584 B2 | 11/2022 | Martysevich et al. |
| 11,512,025 B2 | 11/2022 | Eldred et al. |
| 11,535,588 B2 | 12/2022 | Favero et al. |
| 11,536,125 B1 | 12/2022 | Yang et al. |
| 11,560,776 B2 | 1/2023 | Madasu |
| 11,566,488 B2 | 1/2023 | Brandl et al. |
| 11,566,504 B2 | 1/2023 | Perez et al. |
| 11,568,111 B2 | 1/2023 | Zhou et al. |
| 11,578,262 B2 | 2/2023 | Gordon et al. |
| 11,590,469 B2 | 2/2023 | Cho et al. |
| 11,591,903 B2 | 2/2023 | Mukherjee |
| 11,597,872 B2 | 3/2023 | Conkle |
| 11,608,724 B2 | 3/2023 | Chopade et al. |
| 11,608,740 B2 | 3/2023 | Moos et al. |
| 11,613,691 B1 | 3/2023 | Pollock |
| 11,613,989 B2 | 3/2023 | Zhang et al. |
| 11,629,284 B1 | 4/2023 | Saini et al. |
| 11,629,581 B2 | 4/2023 | Cook |
| 11,643,592 B1 | 5/2023 | Saini et al. |
| 11,649,398 B1 | 5/2023 | AlTammar et al. |
| 11,656,002 B2 | 5/2023 | Nevison et al. |
| 11,661,842 B2 | 5/2023 | Dalamarinis et al. |
| 11,667,831 B2 | 6/2023 | Liang et al. |
| 11,667,832 B2 | 6/2023 | Saini et al. |
| 11,674,074 B2 | 6/2023 | Sherman |
| 11,692,127 B2 | 7/2023 | Dawson et al. |
| 11,692,424 B2 | 7/2023 | Nguyen et al. |
| 11,697,759 B1 | 7/2023 | Dusterhoft et al. |
| 11,697,760 B2 | 7/2023 | Stover et al. |
| 11,702,587 B2 | 7/2023 | Li et al. |
| 11,702,588 B1 | 7/2023 | Saini et al. |
| 11,713,414 B1 | 8/2023 | Dobson et al. |
| 11,732,179 B2 | 8/2023 | Vidma et al. |
| 11,753,584 B2 | 9/2023 | Mazrooee et al. |
| 11,753,919 B2 | 9/2023 | Velikanov et al. |
| 11,753,923 B2 | 9/2023 | Dalamarinis |
| 11,767,466 B2 | 9/2023 | Santra et al. |
| 11,781,062 B1 | 10/2023 | Liu et al. |
| 11,781,412 B2 | 10/2023 | Zhang et al. |
| 11,814,923 B2 | 11/2023 | Sherman et al. |
| 11,827,845 B2 | 11/2023 | Vigderman et al. |
| 11,840,911 B2 | 12/2023 | Fan et al. |
| 11,845,895 B2 | 12/2023 | Montalvo et al. |
| 11,859,129 B2 | 1/2024 | Uddenburg et al. |
| 11,859,489 B2 | 1/2024 | Werry et al. |
| 11,876,398 B1 | 1/2024 | Heath et al. |
| 11,965,677 B2 | 4/2024 | Cook et al. |
| 12,037,894 B2 | 7/2024 | Zhang et al. |
| 2001/0001308 A1 | 5/2001 | Varadaraj et al. |
| 2004/0014824 A1 | 1/2004 | Leinweber et al. |
| 2004/0040708 A1 | 3/2004 | Stephenson et al. |
| 2005/0244641 A1 | 11/2005 | Vincent |
| 2005/0274523 A1 | 12/2005 | Brannon et al. |
| 2006/0073980 A1 | 4/2006 | Brannon et al. |
| 2006/0175059 A1 | 8/2006 | Sinclair et al. |
| 2006/0272816 A1 | 12/2006 | Willberg et al. |
| 2008/0135246 A1 | 6/2008 | Canova et al. |
| 2008/0156489 A1 | 7/2008 | Pershikova et al. |
| 2009/0038797 A1 | 2/2009 | Skala et al. |
| 2009/0038799 A1 | 2/2009 | Garcia-Lopez de Victoria et al. |
| 2009/0075847 A1 | 3/2009 | Wawrzos et al. |
| 2009/0283447 A1 | 11/2009 | D'Elia et al. |
| 2010/0163234 A1* | 7/2010 | Fuller ..................... C09K 8/86 166/278 |
| 2010/0179077 A1 | 7/2010 | Turakhia et al. |
| 2010/0263865 A1 | 10/2010 | Willberg et al. |
| 2011/0082033 A1 | 4/2011 | Frohs et al. |
| 2011/0111990 A1 | 5/2011 | Pershikova et al. |
| 2011/0118155 A1 | 5/2011 | Pisklak et al. |
| 2012/0043080 A1 | 2/2012 | Edwards |
| 2012/0088699 A1 | 4/2012 | Qin |
| 2012/0241168 A1 | 9/2012 | Pei et al. |
| 2012/0267102 A1 | 10/2012 | Huang et al. |
| 2013/0025867 A1 | 1/2013 | Sun et al. |
| 2014/0014338 A1 | 1/2014 | Crews et al. |
| 2014/0096952 A1 | 4/2014 | Hocking |
| 2014/0196898 A1 | 7/2014 | Tanguay et al. |
| 2014/0209390 A1 | 7/2014 | Jamison et al. |
| 2014/0353042 A1 | 12/2014 | Karale et al. |
| 2015/0167437 A1 | 6/2015 | Dawson |
| 2015/0211346 A1 | 7/2015 | Potapenko et al. |
| 2015/0233226 A1 | 8/2015 | Holzhauser et al. |
| 2015/0247084 A1 | 9/2015 | Epstein |
| 2015/0292279 A1 | 10/2015 | Wang |
| 2015/0361331 A1 | 12/2015 | Tanguay et al. |
| 2016/0137910 A1 | 5/2016 | Chang et al. |
| 2016/0215205 A1 | 7/2016 | Nguyen et al. |
| 2016/0319185 A1 | 11/2016 | Semenov et al. |
| 2016/0326300 A1 | 11/2016 | Gelves et al. |
| 2016/0340573 A1 | 11/2016 | Semenov et al. |
| 2017/0145302 A1 | 5/2017 | Qin et al. |
| 2017/0198209 A1 | 7/2017 | Stephenson et al. |
| 2017/0321105 A1 | 11/2017 | McDaniel et al. |
| 2018/0066179 A1 | 3/2018 | Nguyen et al. |
| 2018/0282222 A1 | 10/2018 | Khan |
| 2018/0339946 A1 | 11/2018 | Öttinger et al. |
| 2019/0016944 A1 | 1/2019 | Eldred et al. |
| 2019/0048146 A1 | 2/2019 | Dei Santi et al. |
| 2019/0112520 A1 | 4/2019 | Knoer et al. |
| 2019/0241789 A1 | 8/2019 | Agapiou et al. |
| 2019/0330520 A1 | 10/2019 | Cannan et al. |
| 2020/0131431 A1 | 4/2020 | Russum |
| 2020/0157415 A1 | 5/2020 | Quintero et al. |
| 2020/0208047 A1 | 7/2020 | Gordon et al. |
| 2020/0306710 A1 | 10/2020 | Cho et al. |
| 2020/0370405 A1 | 11/2020 | Nguyen et al. |
| 2021/0002994 A1 | 1/2021 | Zhou et al. |
| 2021/0087459 A1 | 3/2021 | Patil et al. |
| 2021/0131261 A1 | 5/2021 | Wang et al. |
| 2021/0207465 A1 | 7/2021 | Nguyen et al. |
| 2021/0229049 A1 | 7/2021 | Mazrooee et al. |
| 2021/0246364 A1 | 8/2021 | Gordon et al. |
| 2021/0253943 A1 | 8/2021 | Ghosh et al. |
| 2021/0253944 A1 | 8/2021 | Gordon et al. |
| 2021/0317733 A1 | 10/2021 | Downey |
| 2021/0340432 A1 | 11/2021 | Bhaduri et al. |
| 2022/0090475 A1 | 3/2022 | Radwan |
| 2022/0112422 A1 | 4/2022 | Liang et al. |
| 2022/0169915 A1 | 6/2022 | Barron et al. |
| 2022/0186605 A1 | 6/2022 | Quan et al. |
| 2022/0340809 A1 | 10/2022 | Li et al. |
| 2022/0349801 A1 | 11/2022 | Al-Boghail et al. |
| 2023/0085175 A1 | 3/2023 | Smalls et al. |
| 2023/0119075 A1 | 4/2023 | Hall et al. |

(56) References Cited

U.S. PATENT DOCUMENTS

| | | | |
|---|---|---|---|
| 2023/0123954 A1 | 4/2023 | Maity et al. | |
| 2023/0132325 A1 | 4/2023 | Gordon et al. | |
| 2023/0134440 A1* | 5/2023 | Decker | C09K 8/805 |
| | | | 507/219 |
| 2023/0147476 A1 | 5/2023 | Wheelock et al. | |
| 2023/0167354 A1 | 6/2023 | Stojkovic et al. | |
| 2023/0174848 A1 | 6/2023 | Uddenburg et al. | |
| 2023/0175377 A1 | 6/2023 | Nedwed et al. | |
| 2023/0183561 A1 | 6/2023 | Carroll et al. | |
| 2023/0203362 A1 | 6/2023 | Calvin | |
| 2023/0229830 A1 | 7/2023 | Zhao et al. | |
| 2023/0257646 A1 | 8/2023 | Robl et al. | |
| 2023/0279285 A1 | 9/2023 | Shirley | |
| 2023/0279286 A1 | 9/2023 | Gordon | |
| 2023/0303911 A1 | 9/2023 | Radwan | |
| 2023/0334199 A1 | 10/2023 | Lu et al. | |
| 2024/0110471 A1 | 4/2024 | Zhang et al. | |
| 2024/0228866 A1 | 7/2024 | Shirley et al. | |
| 2024/0228867 A1 | 7/2024 | Stojkovic et al. | |

FOREIGN PATENT DOCUMENTS

| | | | |
|---|---|---|---|
| CN | 203319922 U | 12/2013 | |
| CN | 109236262 A | 8/2020 | |
| CN | 109751029 B | 10/2021 | |
| PL | 234113 B1 | 3/2018 | |
| PL | 234114 B1 | 11/2018 | |
| WO | 2007141519 A2 | 12/2007 | |
| WO | 2008033225 A2 | 3/2008 | |
| WO | 2011163529 A1 | 12/2011 | |
| WO | 2012040025 A2 | 3/2012 | |
| WO | 2012051026 A2 | 4/2012 | |
| WO | 2012104582 A1 | 8/2012 | |
| WO | 2013059793 A2 | 4/2013 | |
| WO | 2013119507 A1 | 8/2013 | |
| WO | 2013158308 A1 | 10/2013 | |
| WO | 2013176977 A1 | 11/2013 | |
| WO | 2014039968 A1 | 3/2014 | |
| WO | 2014172953 A1 | 10/2014 | |
| WO | 2014172955 A1 | 10/2014 | |
| WO | 2015021523 A1 | 2/2015 | |
| WO | 2015031415 A2 | 3/2015 | |
| WO | 2015041690 A1 | 3/2015 | |
| WO | 2016033533 A1 | 3/2016 | |
| WO | 2016054022 A1 | 4/2016 | |
| WO | 2016074075 A1 | 5/2016 | |
| WO | 2016168719 A1 | 10/2016 | |
| WO | 2018001748 A1 | 1/2018 | |
| WO | 2018094123 A1 | 5/2018 | |
| WO | 2019164694 A1 | 8/2019 | |
| WO | 2019199431 A1 | 10/2019 | |
| WO | 2019/222034 A1 | 11/2019 | |
| WO | 2020131122 A1 | 6/2020 | |
| WO | 2020139472 A1 | 7/2020 | |
| WO | 2020185373 A1 | 9/2020 | |
| WO | 2021030287 A1 | 2/2021 | |
| WO | 2022232715 A1 | 11/2022 | |
| WO | 2022241338 A1 | 11/2022 | |
| WO | 2022241339 A1 | 11/2022 | |
| WO | 2023040535 A1 | 3/2023 | |
| WO | 2024131192 A1 | 6/2024 | |

OTHER PUBLICATIONS

International Search Report and Written Opinion, dated Apr. 27, 2021 issued in related PCT Application No. PCT/US2021/015153, 11 pages.

International Search Report and Written Opinion, dated Jun. 18, 2023 issued in related PCT Application No. PCT/US2023/063275, 9 pages.

Chang, F.F., Berger, P.D., Lee C.H., "In-Situ Formation of Proppant and Highly Permeable Blocks for Hydraulic Fracturing", SPE-173328-MS, presented at SPE Hydraulic Fracturing Technology Conference, Woodlands, TX Feb. 3-5, 2015. Abstract.

A. Abrams, "Mud Design To Minimize Rock Impairment Due To Particle Invasion", J Pet Technol 29 (05): 586-592, May 1, 1977.

Alvarez et al., "Wettability Alteration and Spontaneous Imbibition in Unconventional Liquid Reservoirs by Surfactant Additives", SPE Res 4:21): 107-117, Jun. 28, 2016.

Alzanam et al., "A Multiwalled Carbon Nanotube-Based Polyurethane Nanocomposite-Coated Sand/Proppant for Improved Mechanical Strength and Flowback Control in Hydraulic Fracturing Applications", ACS Omega, vol. 6, Issue 32, Aug. 5, 2021.

Arshadi et al., "Proppant-packed fractures in shale gas reservoirs: An in-situ investigation of deformation, wettability, and multiphase flow effects", Journal of Natural Gas Science and Engineering, vol. 59, Nov. 2018.

Arshadi et al., "The effect of deformation on two-phase flow through proppant-packed fractured shale samples: A micro-scale experimental investigation", Advances in Water Resources, vol. 105, Jul. 2017.

Calvin et al., "Enhancement of Well Production in the Scoop Woodford Shale through the Application of Microproppant", Paper presented at the SPE Hydraulic Fracturing Technology Conference and Exhibition, The Woodlands, Texas, USA, Jan. 24, 2017.

Dahl et al., "Application of Micro-Proppant to Enhance Well Production in Unconventional Reservoirs: Laboratory and Field Results", Paper presented at the SPE Western Regional Meeting, Garden Grove, California, USA, Apr. 27, 2015.

Dong et al., "Effect of surface wettability of ceramic proppant on oil flow performance in hydraulic fractures", Energy Science & Engineering, vol. 7, issue 2, Feb. 19, 2019.

Edward Furimsky, "Characterization of cokes from fluid/flexicoking of heavy feeds", Fuel Processing Technology, vol. 67, No. 3, 205-230, XP055559715, Sep. 1, 2000, 5 pages.

Elkhatib et al., "Pore-Scale Study of Wettability Alteration and Fluid Flow in Propped Fractures of Ultra-Tight Carbonates", Langmuiir, col. 39 Issue 5, Jan. 24, 2023.

Go et al., "Evaluation of Coated Proppant Unconventional Performance", Energy & Fuels, vol. 35, Issue 11, May 17, 2021.

Huang et al., "Effects of Proppant Wettability and Size on Transport and Retention of Coal Fines in Saturated Proppant Packs: Experimental and Theoretical Studies", Energy Fuels 2021, 35, 15, 11976-11991, Jul. 7, 2021.

International Search Report and the Written Opinion of the International Searching Authority, mailed Jun. 13, 2022, International Application No. PCT/US2022/070811, 10 pages.

International Search Report and the Written Opinion of the International Searching Authority, mailed Jun. 13, 2022, International Application No. PCT/US2022/070776, 10 pages.

International Search Report and the Written Opinion of the International Searching Authority, mailed May 19, 2023, International Application No. PCT/US2023/062816, 10 pages.

Jackson et al., "Stimulation Design and Treatment in the Sycamore Formation of the South Central Oklahoma Oil Province Area of the Anadarko Basin", Paper presented at the SPE Hydraulic Fracturing Technology Conference and Exhibition, The Woodlands, Texas, USA, Jan. 23, 2018.

Kumar et al., "The Role of Micro-Proppants in Conductive Fracture Network Development", Paper presented at the SPE Hydraulic Fracturing Technology Conference and Exhibition, The Woodlands, Texas, USA, Jan. 29, 2019.

Labus K. et al., "IOP Conference Series: Earth and Environmental Science Paper @Bullet Open Access The concept of coke based proppants for coal bed fracturing", XP055798892, Dec. 31, 2019, 12 pages.

Lau et al., "Maximizing Production from Shale Reservoir by Using Micro-Sized Proppants", Paper presented at the International Petroleum Technology Conference, Beijing, China, Mar. 22, 2019.

Le et al., "Methane foam performance in oil-wet unconsolidated porous media: A systematic experimental investigation at reservoir conditions", Fuel, vol. 344, Jul. 15, 2023.

Liao et al., "Lightweight proppants in unconventional oil and natural gas development: A review", Sustainable Materials and Technologies, vol. 33, Sep. 2022.

(56) References Cited

OTHER PUBLICATIONS

Mishra Debesh Devadutta, "Thermal Analysis of Polyethylene Terephthalate (PET)-Coke Composites Prepared by Mechanical Alloying Technique", XP055926292, DOI: 10.20944/preprints201608. 0099.vl, Aug. 2, 2016, 21 pages.

Montgomery et al., "Utilizing Discrete Fracture Modeling and Microproppant to Predict and Sustain Production Improvements in Nano Darcy Rock", Paper presented at the SPE Hydraulic Fracturing Technology Conference and Exhibition, The Woodlands, Texas, USA, Jan. 28, 2020.

Ngata et al., "Review of Developments in Nanotechnology Application for Formation Damage Control", Energy & Fuels, vol. 36, Issue 1, Dec. 27, 2021.

Palisch et al., "Initial Observations From a Bakken Microproppant Field Trial", Paper presented at the SPE Hydraulic Fracturing Technology Conference and Exhibition, The Woodlands, Texas, USA, Jan. 24, 2023.

Radwan et al., "An Engineered Microparticles-Based Slurry Pumped in Over 10,000 Stages Provided Notable Operational and Production Improvements in Challenging Formations", Paper presented at the SPE Annual Technical Conference and Exhibition, Houston, Texas, USA, Sep. 26, 2022.

Tabatabaei et al., "Surface Modification of Proppant Using Hydrophobic Coating To Enhance Long-Term Production", SPE Production & Operations, vol. 36, Issue 1, Feb. 10, 2021.

Wang et al., "Effect of Fluid Contact Angle of Oil-Wet Fracture Proppant on the Competing Water/Oil Flow in Sandstone-Proppant Systems", Sustainability, Mar. 23, 2022.

Wang et al., "Experimental and numerical investigations of water-oil two-phase flow in fractures with proppants of different wetting properties", Journal of Petroleum Science and Engineering, vol. 214, Jul. 2022.

White Paper, "Significant Uplift Achieved with Production Enhancement Product", The Future of Well Enhancement, Deeprop Microproppant, 8 pages.

Wu et al., "An Experimental Investigation of the Conductivity of Unpropped Fractures in Shales", Paper presented at the SPE Hydraulic Fracturing Technology Conference and Exhibition, The Woodlands, Texas, USA, Jan. 24, 2017.

Xiao et al., "Effect of surface wetting behavior of ceramic proppant on the two-phase flow across the interface of sandstone and fracture", Energy Science & Engineering, vol. 8 issue 4, Dec. 19, 2019.

Alvarez et al., "Design of Chemical EOR in Unconventional Reservoirs", Paper presented at the SPE/AAPG/SEG Unconventional Resources Technology Conference, Denver, Colorado, USA, Jun. 13, 2023.

Ataceri et al., "Case Study: Surfactant EOR Improves Oil Recovery in Eagle Ford Declined Unconventional Well", Proceedings of the 11th Unconventional Resources Technology Conference, 2003.

International Search Report and the Written Opinion of the International Searching Authority, mailed Jun. 10, 2025, International Application No. PCT/US2025/019906, 13 pages.

International Search Report and the Written Opinion of the International Searching Authority, mailed Jun. 10, 2025, International Application No. PCT/US2025/019904, 12 pages.

International Search Report and the Written Opinion of the International Searching Authority, mailed Feb. 28, 2025, International Application No. PCT/US2024/056651, 9 pages.

International Search Report and the Written Opinion of the International Searching Authority, mailed Feb. 17, 2025, International Application No. PCT/US2024/056647, 12 pages.

International Search Report and the Written Opinion of the International Searching Authority, mailed Feb. 17, 2025, International Application No. PCT/US2024/056648, 15 pages.

International Search Report and the Written Opinion of the International Searching Authority, mailed Feb. 17, 2025, International Application No. PCT/US2024/056649, 13 pages.

International Search Report and the Written Opinion of the International Searching Authority, mailed Feb. 24, 2025, International Application No. PCT/US2024/056652, 12 pages.

* cited by examiner

Brine

200

208

202
Oil-
Saturated
Petroleum
Coke

204

Brine

208

206
Oil-
Saturated
Sand

Oil

218

210

212
Brine-
Saturated
Petroleum
Coke

Oil

218

214

216
Brine-
Saturated
Sand

300

400

METHODS FOR PRODUCING HYDROCARBON FLUIDS WITH REDUCED WATER-OIL RATIO BY UTILIZING OIL-WET PETROLEUM COKE PROPPANT PARTICLES DURING HYDRAULIC FRACTURING

CROSS-REFERENCE TO RELATED APPLICATION

This application claims priority to and the benefit of co-pending and commonly-assigned U.S. patent application Ser. No. 18/417,433, filed Jan. 19, 2024, titled "HYDRAULIC FRACTURING FLUID COMPRISING MICRO-PROPPANT COKE PARTICLES, METHOD FOR MAKING SAME, AND HYDRAULIC FRACTURING PROCESSES USING SAME," co-pending and commonly-assigned U.S. patent application Ser. No. 18/417,478, filed Jan. 19, 2024, titled "METHODS FOR PERFORMING REFRACTURING OPERATIONS USING COKE PROPPANT PARTICLES," co-pending and commonly-assigned U.S. patent application Ser. No. 18/417,492, filed Jan. 19, 2024, titled "PROPPANT PARTICLES FORMED FROM FLUID COKE AND FLEXICOKE, FRACTURING FLUIDS COMPRISING SUCH PROPPANT PARTICLES, AND METHODS RELATED THERETO," co-pending and commonly-assigned U.S. patent application Ser. No. 18/417,488, filed Jan. 19, 2024, titled "HYDRAULIC FRACTURING METHODS UTILIZING COKE PROPPANT PARTICLES," and co-pending and commonly-assigned U.S. patent application Ser. No. 18/417,483, filed Jan. 19, 2024, titled "METHODS FOR PRODUCING HYDROCARBON FLUIDS WITH REDUCED WATER-OIL RATIO BY UTILIZING OIL-WET PETROLEUM COKE PROPPANT PARTICLES DURING HYDRAULIC FRACTURING," the contents of all of which are incorporated by reference herein in their entirety.

FIELD

This disclosure relates generally to the fields of hydraulic fracturing and hydrocarbon production. More specifically, this disclosure relates to methods for reducing the water-oil ratio of the hydrocarbon fluids produced via hydrocarbon wells by utilizing oil-wet petroleum coke proppant particles during the hydraulic fracturing of such hydrocarbon wells.

BACKGROUND

This section is intended to introduce various aspects of the art, which may be associated with aspects and embodiments of the present disclosure. This discussion is believed to assist in providing a framework to facilitate a better understanding of particular aspects and embodiments of the present disclosure. Accordingly, it should be understood that this section should be read in this light, and not necessarily as admissions of prior art.

A wellbore can be drilled into a subterranean formation to promote removal (or production) of a material such as hydrocarbon, coal, mineral, water, and the like. In many cases, the subterranean formation needs to be stimulated in some manner to promote removal of the resource. Stimulation can include any operation performed upon the matrix of a subterranean formation to improve fluid conductivity therethrough, including hydraulic fracturing, which is a commonly used for unconventional reservoirs.

Hydraulic fracturing typically involves the pumping of large quantities of fracturing fluid into a subterranean formation (e.g., a low-permeability formation) under high hydraulic pressure to promote the formation of one or more fractures within the matrix of the formation and to create high-conductivity flow paths. Primary fractures extending from the wellbore and, in some instances, secondary fractures extending from the primary fractures are formed during a fracturing operation. These fractures may be vertical, horizontal, or a combination of directions forming a tortuous path.

Proppant particles are often included in the fracturing fluid. Once the fracturing fluid has been pumped into the subterranean formation, it is desired that such proppant particles could be transported into the fractures and settle therein. Upon pressure release, the proppant particles remaining in the fractures keep the fractures open by preventing them from collapsing, facilitating the flow of desired products such as hydrocarbons from the fractured formations into the wellbore through the propped fractures. The performance of the proppant can affect the recovery of the intended products such as hydrocarbons significantly.

However, other factors also influence the success of the production operation. In particular, even assuming that the hydraulic fractures permit large quantities of hydrocarbon fluids to be produced via the wellbore, the quality of such hydrocarbon fluids is limited by the quantity of produced water as compared to the quantity of produced oil (which is referred to herein as the "water-oil ratio"), with hydrocarbon fluids including a higher percentage of water being of lower quality and lower value. As a result, techniques have been developed to reduce the water-oil ratio of hydrocarbon fluids produced via hydrocarbon wells by modifying the characteristics of the rock in the subterranean formations surrounding such wells. Specifically, such techniques often attempt to alter the wettability properties of such rock, where the term "wettability" refers to a property of a solid that describes the tendency of a liquid to spread on (or adhere to) the solid in the presence of another immiscible liquid. Wettability plays an important role in determining the interactions between the rock and the liquids, i.e., the oil and water, within a subterranean formation, with the wettability properties of the rock determining at least in part how easily each type of liquid will flow around such rock and, thus, be primarily produced via the corresponding wellbore. A particular type of solid can be classified as water-wet, mixed-wet, or oil-wet. If the solid is oil-wet, oil is preferentially in contact with the solid when water is in the surrounding phase. In contrast, if the solid is water-wet, water is preferentially in contact with the solid when oil is in the surrounding phase. Therefore, according to conventional techniques, it is desirable to increase the water wettability of the rock in the subterranean formation to increase the oil relative permeability within the rock, which thereby promotes the flow of oil around such rock and into the hydraulic fractures. This is often achieved by injecting surfactants into the subterranean formation, for example. However, such conventional techniques for increasing the water wettability of the rock do not positively impact the ability of oil to cross the interface between the subterranean formation and the hydraulic fractures. Instead, as the water wettability of the rock increases, the capillary pressure for oil to enter the hydraulic fractures also increases, rendering it more difficult for oil to enter the hydraulic fractures. Accordingly, even after increasing the oil relative permeability within the rock, the production operation may still be negatively impacted by the low affinity for oil to actually enter the hydraulic fractures. Therefore, there is a genuine need of high-performance proppants, fracturing fluids, and hydraulic fracturing methods in the industry. This disclosure satisfies these and other needs.

SUMMARY

An aspect of this disclosure provides a method for producing hydrocarbon fluids via a hydrocarbon well. The method includes providing petroleum coke proppant particles having an Amott index for oil of at least 0.02, an Amott index for water of at most 0.1, and a pseudo Amott index of at most 0.35. The method also includes, for each of a number of stages of the hydrocarbon well, introducing a fracturing fluid including a carrier fluid and the petroleum coke proppant particles into a subterranean formation via a wellbore of the hydrocarbon well and then producing hydrocarbon fluids from the subterranean formation via the wellbore of the hydrocarbon well.

Another aspect of this disclosure provides a method for producing and utilizing the oil-wet petroleum coke proppant particles. The method includes providing the oil-wet petroleum coke proppant particles by, during the generation of petroleum coke within a reactor, decreasing the temperature in the reactor by 5° C. to 15° C. to strip at least a portion of light hydrocarbons from the petroleum coke, providing the oil-wet petroleum coke proppant particles with an Amott index for oil of at least 0.02, an Amott index for water of at most 0.1, and a pseudo Amott index of at most 0.35. The method also includes introducing a fracturing fluid including a carrier fluid and the oil-wet petroleum coke proppant particles into a subterranean formation.

Another aspect of this disclosure provides a method for producing and utilizing the oil-wet petroleum coke proppant particles. The method includes providing the oil-wet petroleum coke proppant particles by coating petroleum coke proppant particles with wax and/or resin, providing the oil-wet petroleum coke proppant particles with an Amott index for oil of at least 0.02, an Amott index for water of at most 0.1, and a pseudo Amott index of at most 0.35. The method also includes introducing a fracturing fluid including a carrier fluid and the oil-wet petroleum coke proppant particles into a subterranean formation.

Another aspect of this disclosure provides a method for producing and utilizing the oil-wet petroleum coke proppant particles. The method includes providing the oil-wet petroleum coke proppant particles by thermally post-treating petroleum coke proppant particles and reacting the petroleum coke proppant particles with an organosilane, providing the oil-wet petroleum coke proppant particles with an Amott index for oil of at least 0.02, an Amott index for water of at most 0.1, and a pseudo Amott index of at most 0.35. The method also includes introducing a fracturing fluid including a carrier fluid and the oil-wet petroleum coke proppant particles into a subterranean formation.

These and other features and attributes of the disclosed aspects and embodiments of the present disclosure and their advantageous applications and/or uses will be apparent from the detailed description that follows.

BRIEF DESCRIPTION OF THE DRAWINGS

To assist those of ordinary skill in the relevant art in making and using the subject matter described herein, reference is made to the appended drawings, where:

4

Figure 1:
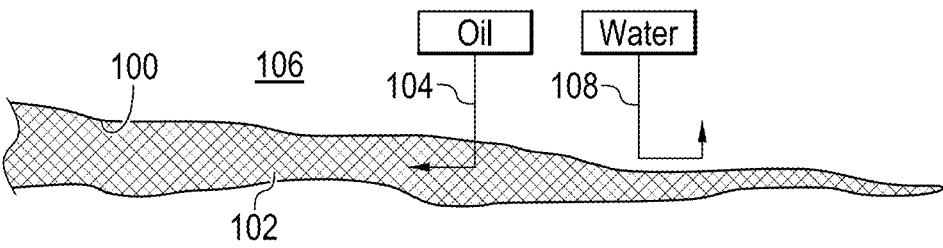
Figure 2A:
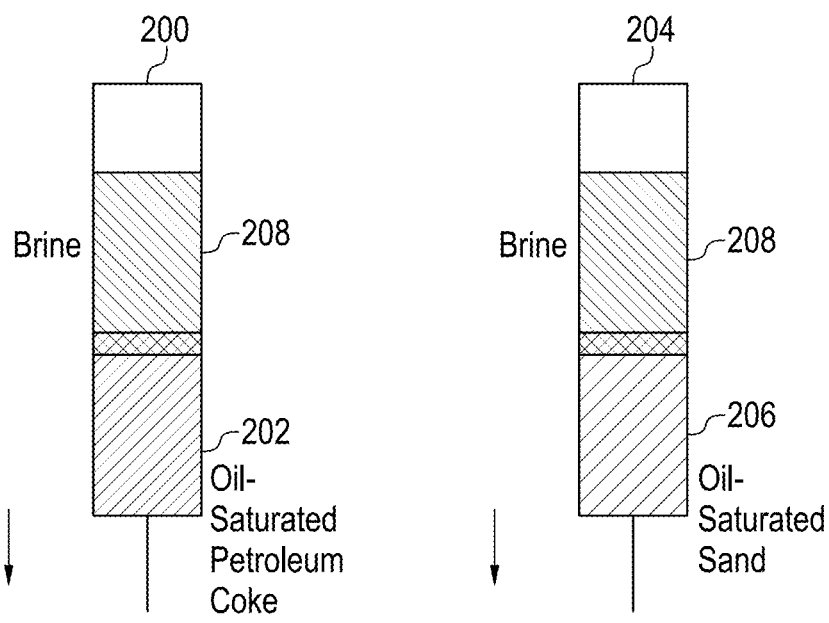
Figure 2B:
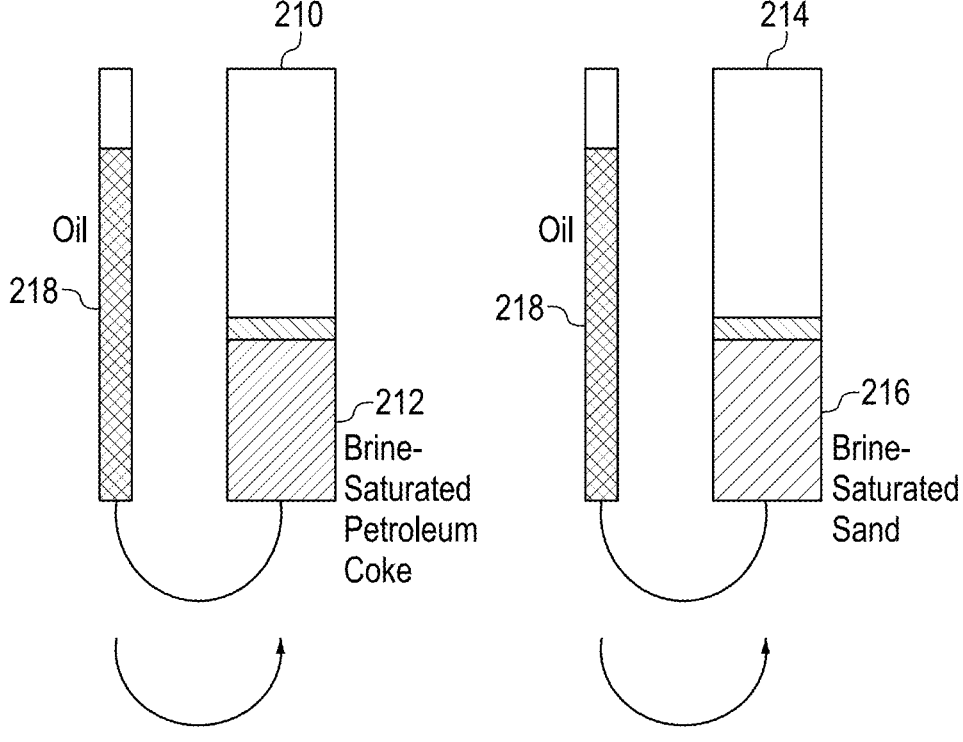
Figure 3:
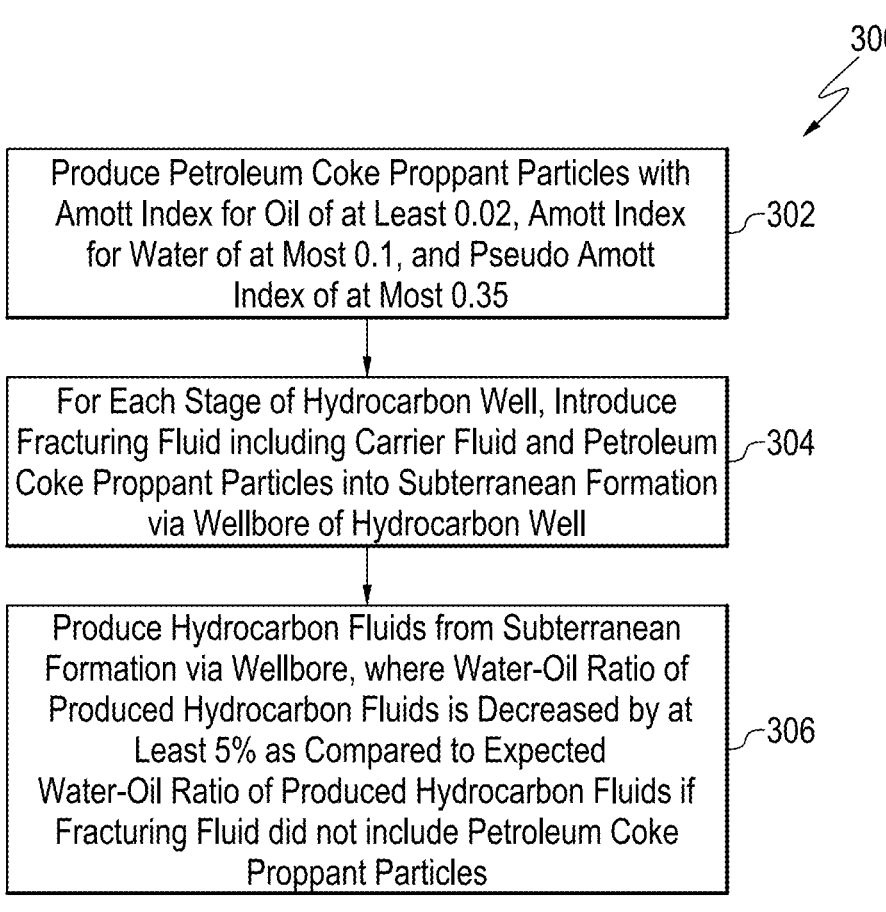
Figure 4:
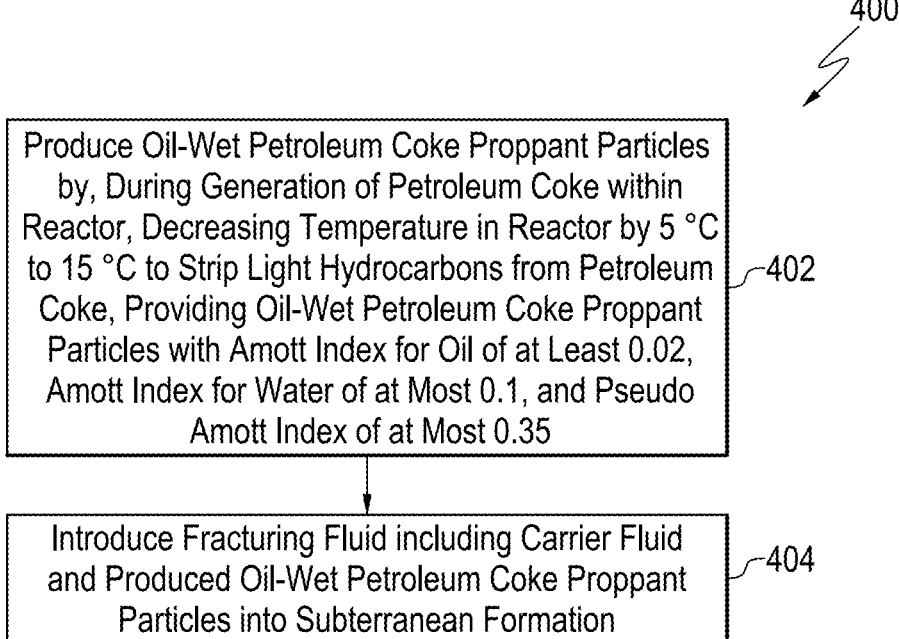
Figure 5:
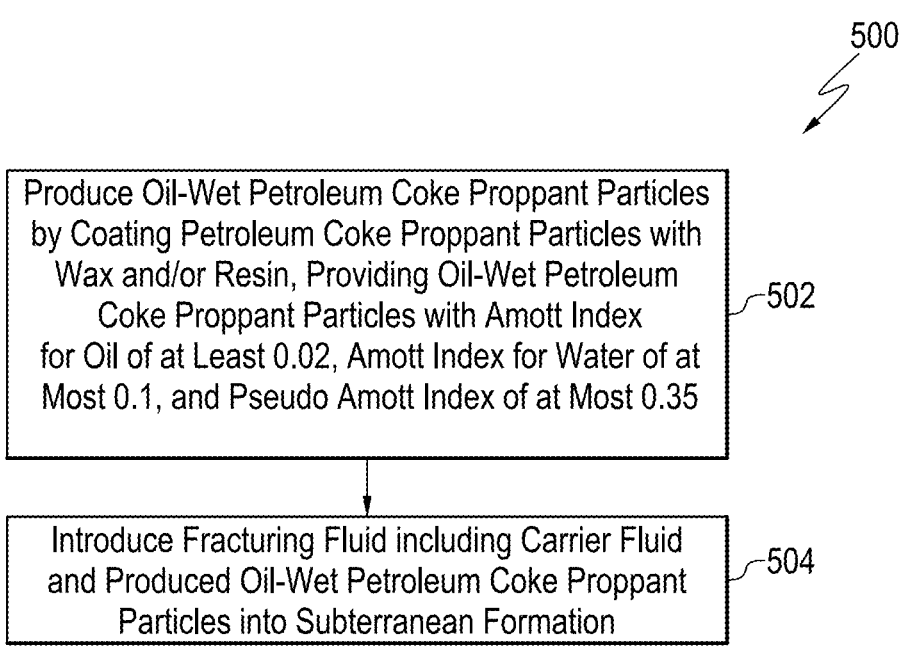
Figure 6:
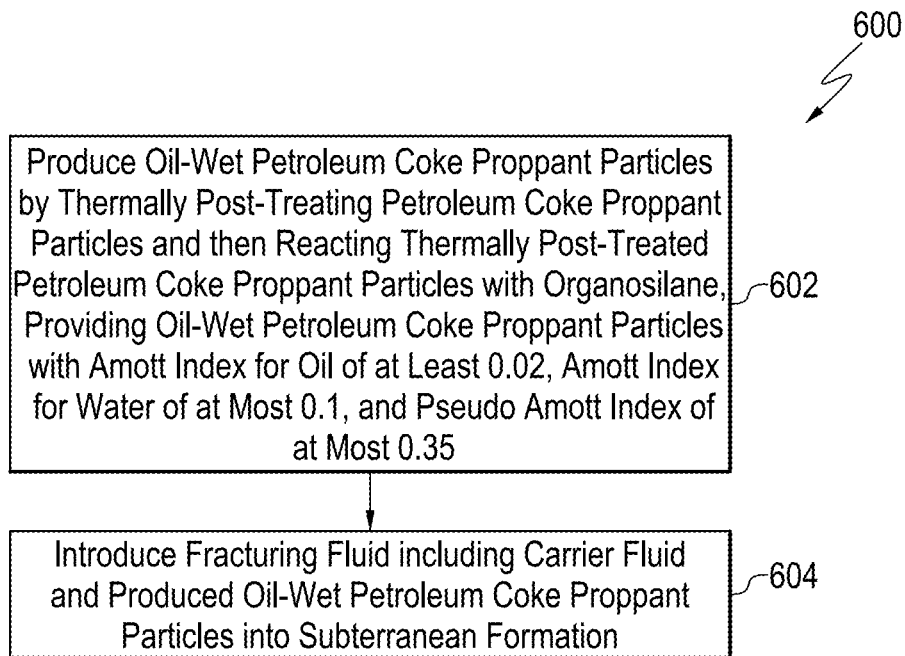

FIG. 1 is a simplified schematic view of a hydraulic fracture including oil-wet petroleum coke proppant particles in accordance with the present disclosure;

FIG. 2A is a simplified schematic view of a first test that demonstrates the difference in water breakthrough time for a first burette packed with oil-saturated petroleum coke and a second burette packed with oil-saturated sand;

FIG. 2B is a simplified schematic view of a second test that demonstrates the difference in oil breakthrough time for a first burette packed with brine-saturated petroleum coke and a second burette packed with brine-saturated sand;

FIG. 3 is a process flow diagram of an exemplary method for producing hydrocarbon fluids with a reduced water-oil ratio by utilizing petroleum coke proppant particles during hydraulic fracturing in accordance with the present disclosure;

FIG. 4 is a process flow diagram of an exemplary method for producing and utilizing oil-wet petroleum coke proppant particles in accordance with the present disclosure;

FIG. 5 is a process flow diagram of another exemplary method for producing and utilizing oil-wet petroleum coke proppant particles in accordance with the present disclosure; and FIG. 6 is a process flow diagram of another exemplary method for producing and utilizing oil-wet petroleum coke proppant particles in accordance with the present disclosure.

It should be noted that the figures are merely examples of the present disclosure and are not intended to impose limitations on the scope of the present disclosure. Further, the figures are generally not drawn to scale, but are drafted for purposes of convenience and clarity in illustrating various aspects of the present disclosure.

DETAILED DESCRIPTION

In the following detailed description section, the specific examples of the present disclosure are described in connection with preferred aspects and embodiments. However, to the extent that the following description is specific to one or more aspects or embodiments of the present disclosure, this is intended to be for exemplary purposes only and simply provides a description of such aspect(s) or embodiment(s). Accordingly, the present disclosure is not limited to the specific aspects and embodiments described below, but rather, includes all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition those skilled in the art have given that term as reflected in at least one printed publication or issued patent. Further, the present disclosure is not limited by the usage of the terms shown below, as all equivalents, synonyms, new developments, and terms or processes that serve the same or a similar purpose are considered to be within the scope of the present claims.

As used herein, the singular forms "a," "an," and "the" mean one or more when applied to any embodiment described herein. The use of "a," "an," and/or "the" does not limit the meaning to a single feature unless such a limit is specifically stated.

The terms "about" and "around" mean a relative amount of a material or characteristic that is sufficient to provide the intended effect. The exact degree of deviation allowable in some cases may depend on the specific context, e.g., ±1%, ±5%, ±10%, ±15%, etc. It should be understood by those of skill in the art that these terms are intended to allow a description of certain features described and claimed without restricting the scope of these features to the precise numerical ranges provided. Accordingly, these terms should be interpreted as indicating that insubstantial or inconsequential modifications or alterations of the subject matter described are considered to be within the scope of the disclosure.

The term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "including," may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the term "any" means one, some, or all of a specified entity or group of entities, indiscriminately of the quantity.

As used herein, the term "apparent density," when used with reference to the density of proppant particles, refers to the density of the individual particles themselves along with any internal porosity that is inaccessible to invading fluids or gases, which may be expressed in grams per cubic centimeter (g/cm$^3$ or g/cc). The apparent density values provided herein are based on the American Petroleum Institute's Recommended Practice 19C (hereinafter "API RP-19C") standard, entitled "Measurement of Properties of Proppants Used in Hydraulic Fracturing and Gravel-packing Operations" (First Ed. May 2008, Reaffirmed June 2016).

The phrase "at least one," when used in reference to a list of one or more entities (or elements), should be understood to mean at least one entity selected from any one or more of the entities in the list of entities, but not necessarily including at least one of each and every entity specifically listed within the list of entities, and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently, "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the term "blast furnace coke" refers to any coal-derived coke suitable for use in a blast furnace for making steel.

The term "capillary pressure" refers to the pressure difference existing across the interface separating two immiscible fluids (e.g., oil and water), which is caused by the interfacial tension existing at such interface. When correlating the capillary pressure with respect to a particular solid to the wettability properties of such solid, the effect of such interfacial tension is to compress the non-wetting phase relative to the wetting phase.

As used herein, the terms "coat" and "coating," when used with reference to petroleum coke proppant particles, refers to the complete or partial covering of such petroleum coke proppant particles, which is intended to encompass surface coating of the petroleum coke proppant particles (e.g., dispersion coating), embedment coating within the pores of the petroleum coke proppant particles, and any combination thereof (e.g., embedment and surface coating). However, the coating need not cover the entirety of the surface of the petroleum coke proppant particles.

As used herein, the term "crush strength," when used with reference to proppant particles, refers to the uniaxial stress (compressive) load that the proppant particles can withstand prior to crushing (e.g., breaking or cracking). The crush strength values of the present disclosure are based on API RP-19C.

As used herein, the term "delayed coke" refers to the solid concentrated carbon material that is produced within delayed coking units via the delayed coking process. According to the delayed coking process, a preheated petroleum-derived feedstock is introduced into a fractionator, where it undergoes a thermal cracking process in which long-chain hydrocarbons are split into shorter-chain hydrocarbons. The resulting lighter fractions are then removed as sidestream products. The fractionator bottoms, which include a recycle stream of heavy product, are heated in a furnace, which can have an outlet temperature of, e.g., around 895° F. to around 960° F. Exemplary outlet temperature ranges include around 900° F. to around 910° F., around 910° F. to around 920° F., around 920° F. to around 930° F., around 930° F. to around 940° F., around 940° F. to around 950° F., and around 950° F. to around 960° F., to name a few non-limiting examples. The heated feedstock then enters a reactor, often referred to as a "coke drum," which can operate at temperatures of, e.g., around 780° F. to around 840° F. Exemplary ranges of reactor temperature include around 780° F. to around 790° F., around 790° F. to around 800° F., around 800° F. to around 810° F., around 810° F. to around 820° F., around 820° F. to around 830° F., and around 830° F. to around 840° F., to name a few non-limiting examples. Within the coke drum, the cracking reactions continue. The resulting cracked products then exit the coke drum as an overhead stream, while coke deposits in the coke drum. In general, this process is continued for a period of around 16 hours to around 24 hours to allow the coke drum to fill with coke. Exemplary ranges of specific cracking process times include around 16 hours to around 18 hours, around 18 hours to around 20 hours, around 20 hours to around 22 hours, and around 22 hours to around 24 hours, to name a few non-limiting examples. In addition, to allow the delayed coking unit to operate on a batch-continuous (or semi-continuous) basis, two or more coke drums are used. While one coke drum is on-line filling with coke, another coke drum can be steam-stripped, cooled, decoked (e.g., via hydraulically cutting the deposited coke with water), pressure-checked, and warmed up. Moreover, the overhead stream exiting the coke drum enters the fractionator, where naphtha and heating oil fractions are recovered. The heavy recycle material is then typically combined with preheated fresh feedstock and recycled back into the process.

As used herein, the terms "example," exemplary," and "embodiment," when used with reference to one or more components, features, structures, or methods according to the present disclosure, are intended to convey that the described component, feature, structure, or method is an illustrative, non-exclusive example of components, features, structures, or methods according to the present disclosure. Thus, the described component, feature, structure, or method is not intended to be limiting, required, or exclusive/exhaustive; and other components, features, structures, or methods, including structurally and/or functionally similar and/or equivalent components, features, structures, or methods, are also within the scope of the present disclosure.

As used herein, the term "flexicoke" refers to the solid concentrated carbon material produced via the FLEXICOK-ING™ process, which is a thermal cracking process utilizing fluidized solids and gasification for the conversion of heavy, low-grade hydrocarbon feeds into lighter hydrocarbon products (e.g., upgraded, more valuable hydrocarbons). Briefly, the FLEXICOKING™ process integrates a cracking reactor, a heater, and a gasifier into a common fluidized-solids (coke) circulating system. A feed stream (of residua) is fed into a fluidized bed, along with a stream of hot recirculating material to the reactor. From the reactor, a stream containing coke is circulated to the heater vessel, where it is heated. The hot coke stream is sent from the heater to the gasifier, where it reacts with air and steam. The gasifier product gas, referred to as coke gas, containing entrained coke particles, is returned to the heater and cooled by cold coke from the reactor to provide a portion of the reactor heat requirement, which is typically in a range from around 496° C. to around 538° C. Exemplary ranges of reactor heating temperature that may be used include around 496° C. to around 500° C., around 500° C. to around 510° C., around 510° C. to around 520° C., around 520° C. to around 530° C., around 530° C. to around 538° C., to name a few non-limiting examples. A return stream of coke sent from the gasifier to the heater provides the remainder of the heat requirement. The coke meeting the heat requirement is then circulated to the reactor, and the feed stream is thermally cracked to produce light hydrocarbon liquids that are removed from the reactor and recovered using conventional fractionating equipment. Coke is formed from the thermal cracking process and settles (deposits) onto the "seed" fluidized bed coke already present in the reactor. The resultant at least partially gasified coke is flexicoke. In some instances, the coke from the thermal cracking process deposits in a pattern that appears ring-like atop the surface of the seed coke. Flexicoke is continuously withdrawn from the system during normal FLEXICOKING™ processing (e.g., from the reactor or after it is streamed to the heater via an elutriator) to ensure that the system maintains particles of coke in a fluidizable particle size range. Accordingly, flexicoke is a readily available byproduct of the FLEXICOKING™ process.

Relatedly, the terms "wet flexicoke fines" and "dry flexicoke fines" refer to two byproducts of the FLEXICOK-ING™ process. Such byproducts are collected as particles that were not recovered in the secondary cyclones of the heater. More specifically, the particles are collected first in the tertiary cyclone as dry flexicoke fines, and the smaller particles that travel past the tertiary cyclone are then recovered in the venturi scrubber as wet flexicoke fines.

As used herein, the term "fluid coke" refers to the solid concentrated carbon material remaining from fluid coking. The term "fluid coking" refers to a thermal cracking process utilizing fluidized solids for the conversion of heavy, low-grade hydrocarbon feeds into lighter products (e.g., upgraded hydrocarbons), producing fluid coke as a byproduct. The fluid coking process differs from the FLEXICOK-ING™ process that produces the Flexicoke in that the fluid coking process does not include a gasifier.

The term "fracture" (or "hydraulic fracture") refers to a crack or surface of breakage in a subterranean formation, that can be induced by an applied pressure or stress.

As used herein, the term "metallurgical coke" refers to a type of coal-derived coke that is produced by heating coal, which causes fixed carbon to fuse to inherent ash and drives off a large percentage of the volatile matter. The resulting metallurgical coke particles include a range of different sizes, with the smallest particles being a fine powder (sometimes referred to as "coke breeze").

The term "particle size(s)," when used herein with reference to a type of particles, refers to the diameter(s) of such particle(s). The term "particle size distribution," when used herein with reference to a type or a collection of particles, refers to the range of diameters for such particles, typically from the minimal to the maximal. The terms "average particle size distribution" and "D50" when used herein with reference to a type or a collection of particles, interchangeably mean the median particle size of the particles.

The term "petroleum coke" refers to a final carbon-rich solid material that is derived from oil refining. More specifically, petroleum coke is the carbonization product of high-boiling hydrocarbon fractions that are obtained as a result of petroleum processing operations. Petroleum coke is produced within a coking unit via a thermal cracking process in which long-chain hydrocarbons are split into shorter-chain hydrocarbons. As described herein, there are at least three main types of petroleum coke: delayed coke, fluid coke, and flexicoke. Each type of petroleum coke is produced using a different coking process; however, all three coking processes have the common objective of maximizing the yield of distillate products within a refinery by rejecting large quantities of carbon in the residue as petroleum coke.

The term "coal-derived coke" means any coke prepared from coal by, e.g., thermal treatment.

As used herein, the terms "proppant" and "proppant particle" refer to a solid material capable of maintaining open an induced fracture during and following a hydraulic fracturing treatment. The term "proppant pack" refers to a collection of proppant particles.

The terms "coke proppant" and "coke proppant particles" refer to a proppant based on or derived from a solid carbonaceous material produced from treating a carbon-containing material (e.g., oil (e.g., crude oil, vacuum pipestill, and the like), coal, and hydrocarbons) at an elevated temperature in an oxygen deficient environment. The elevated temperature can be at least 200, 250, 300, 350, 400, 450, 500, 600, 700, 800, 900, or even 1000° C. The carbonaceous material comprises the carbon element and optionally additional elements including but not limited to hydrogen, sulfur, vanadium, iron, and the like. The carbonaceous material preferably comprises the carbon element at a concentration of ≥50 wt %, e.g., from 50, 55, 60, 65, 70, wt %, to 75, 80, 85, 90, 95 wt %, to 96, 97, 98, 99 wt %, or even 100 wt %, based on the total weight of all elements in the carbonaceous material. The carbonaceous material preferably comprises the carbon element and hydrogen element at a combined concentration of ≥55 wt %, e.g., from 55, 60, 65, 70, wt %, to 75, 80, 85, 90, 95 wt %, to 96, 97, 98, 99 wt %, or even 100 wt %, based on the total weight of all elements in the carbonaceous material.

The term "non-coke proppant" means any proppant that is does not comprise coke proppant particles. Examples of non-coke proppant include sand, ceramic proppants, glass proppants, and polymer proppants.

The term "lightweight proppant (LWP)" refers to proppants having an apparent density within a range of from around 1.2 g/cm³ to around 2.2 g/cm³ (e.g., from around 1.2, 1.3, 1.4, 1.5, 1.6 g/cm³ to around 1.7, 1.8, 1.9, 2.0, 2.1, 2.2 g/cm³), while the term "ultra-lightweight proppant (ULWP)" refers to proppants having an apparent density within a range from around 0.5 g/cm³ to around 1.2 g/cm³ (e.g., from around 0.5, 0.6, 0.7, 0.8 g/cm³ to around 0.9, 1.0, 1.1, 1.2 g/cm³). A coke proppant may or may not be an LWP. The term "non-LWP proppant" refers to proppants having apparent density higher than 2.2 g/cm³ (e.g., from around 2.3, 2.4, 2.5 to around 2.6, 2.8, 3.0, to 3.2, 3.4, 3.5 g/cm³.) A non-coke proppant may or may not be a non-LWP.

The term "microproppant coke particles" means a collection of coke proppant particles having particle sizes of at most 105 μm, but potentially within a range from around 0.0001 μm to 105 μm (e.g., from around 0.0001, 0.001, 0.01, 0.1 μm to 0.5, 1.0, 2.0, 5.0, 8.0 10 μm, to 15, 20, 25, 30, 35, 40, 45 μm, to 50, 53, 55, 60, 63, 65 μm, to 74, 75, 80, 85, 88, 90, 95, 100, 105 μm). The term "petroleum coke fines" means a collection of microproppant coke particles that are derived from a petroleum source material.

As used herein, the term "pyrolysis coke" refers to a type of coke that is generated via hydrocarbon pyrolysis at temperatures higher than the coking processes for making petroleum coke.

As used herein, the term "resin" refers to a solid or viscous substance of plant or synthetic origin that can be converted to polymers capable of adhering to a petroleum coke proppant particle.

As used herein, the term "spontaneous imbibition" refers to an effect whereby the non-wetting phase with respect to a particular type of solid is displaced spontaneously by the wetting phase for such solid due at least in part to the effects of capillary pressure. Relatedly, the term "Amott cell" refers to a device that is specifically designed to be utilized for spontaneous imbibition testing, and the term "Amott index" refers to a wettability measurement that is based on the results of spontaneous imbibition testing using an Amott cell, a dead oil sample and a representative brine sample, measured at 120° F. (48.9° C.).

As used herein, the term "silane" refers to any of various compounds of hydrogen and silicon having the general formula of $Si_nH_{2n+2}$, and the term "organosilane" refers to any of various organic derivatives of silanes containing at least one direct carbon-to-silicon bond.

The term "substantially," when used in reference to a quantity or amount of a material, or a specific characteristic thereof, refers to an amount that is sufficient to provide an effect that the material or characteristic was intended to provide. The exact degree of deviation allowable may depend, in some cases, on the specific context.

The term "substantially free" or "essentially free" when used with reference to a component of a composition, interchangeably means that the composition comprises the component at a concentration of ≤10 wt %, ≤5 wt %, ≤3 wt %, ≤1 wt %, or 0 wt %, based on the total weight of the composition, depending on the details of the particular implementation.

As used herein, the term "thermally post-treated coke" refers to petroleum coke that has been heated to temperatures in a range from around 400° C. to 1200° C. for a predetermined duration that is in a range from around 1 minute to around 24 hours.

The term "wellbore" refers to a borehole drilled into a subterranean formation. The borehole may include vertical, deviated, highly deviated, and/or horizontal sections. The term "wellbore" also includes the downhole equipment associated with the borehole, such as the casing strings, production tubing, gas lift valves, and other subsurface equipment. Relatedly, the term "hydrocarbon well" (or simply "well") includes the wellbore in addition to the wellhead and other associated surface equipment.

As used herein, the term "wettability" refers to a property of a solid that describes the tendency of a liquid to spread on (or adhere to) the solid in the presence of another immiscible liquid. Wettability plays an important role in determining the interactions between the surface of a solid and the liquids, i.e., the oil and water, surrounding such solid, with the wettability properties of the solid determining at least in part how easily each type of liquid will flow around such solid. A particular type of solid can be classified as water-wet, mixed-wet, or oil-wet. If the solid is oil-wet, oil is preferentially in contact with the solid when water is in the surrounding phase. In contrast, if the solid is water-wet, water is preferentially in contact with the solid when oil is in the surrounding phase. As described above, wettability properties have conventionally been described with respect to the rock existing within subterranean formations. However, as described further herein, the present disclosure instead relates to the wettability properties of petroleum coke proppant particles.

The term "wettability alteration" as used herein refers to a process for modifying the wettability of a particular type of solid (i.e., petroleum coke) to the render the solid more oil-wet or more water-wet.

Certain embodiments and features are described herein using a set of numerical upper limits and a set of numerical lower limits. It should be appreciated that ranges from any lower limit to any upper limit are contemplated unless otherwise indicated. All numerical values are "about", "around," or "approximately" the indicated value, and account for experimental errors and variations that would be expected by a person having ordinary skill in the art.

Turning now to details of the present disclosure, as described above, conventional techniques for increasing the water wettability of the rock within subterranean formations often fail to optimize the resulting production operations to a sufficient degree. The present disclosure alleviates the foregoing difficulty and provide related advantages as well. In particular, the present disclosure provides for the reduction of the water-oil ratio of the hydrocarbon fluids produced by hydrocarbon wells via the utilization of oil-wet petroleum coke proppant particles during the hydraulic fracturing of such hydrocarbon wells. According to the present disclosure, the oil wettability of the petroleum coke proppant particles may be specifically increased to decrease the capillary pressure for oil to leave the subterranean formation, thus advantageously encouraging the flow of oil into the hydraulic fractures while simultaneously discouraging the flow of water into such hydraulic fractures. Notably, the present disclosure provides an unexpected result that is contrary to conventional techniques. Specifically, while conventional techniques focus on increasing the oil relative permeability of the formation rock by increasing the water wettability of such rock, the present disclosure instead focuses on decreasing the capillary pressure for oil to leave the rock and enter the hydraulic fractures by increasing the oil wettability of the petroleum coke proppant particles.

Non-coke proppants, such as sand, are typically water-wet. In contrast, petroleum coke is either oil-wet or mixed-wet. The present disclosure leverages this differentiated wettability property of petroleum coke by utilizing petroleum coke proppant particles during hydraulic fracturing operations to reduce the water-oil ratio of the produced hydrocarbons fluids. Specifically, proppant packs formed at least in part from oil-wet petroleum coke provide a lower capillary pressure for oil to pass through the interface between the propped hydraulic fractures and the subterranean formation, thus allowing oil to preferentially flow into the wellbore while water is (at least partially) repelled due to the proppant pack's hydrophobic nature. Furthermore, according to the present disclosure, the water-oil ratio of the produced hydrocarbon fluids may be further decreased by increasing the oil wettability of the petroleum coke proppant particles. In various embodiments, this is accomplished by performing one or more wettability alteration treatments on the petroleum coke proppant particles. As described further herein, such wettability alteration treatments may include but are not limited to stripping light hydrocarbons from the petroleum coke in the refinery, coating the petroleum coke particles with wax and/or resin, and/or thermally post-treating the petroleum coke and then reacting the thermally post-treated coke particles with organosilanes.

The result that is achieved by the present disclosure is illustrated by FIG. 1, which is a simplified schematic view of a hydraulic fracture 100 including oil-wet petroleum coke proppant particles 102 in accordance with the present disclosure. As depicted in FIG. 1, due to the oil wettability of the petroleum coke proppant particles 102, oil 104 within the hydrocarbon fluids in a surrounding subterranean formation 106 easily and preferentially crosses the interface between the subterranean formation 106 and the hydraulic fracture 100. In contrast, due to the hydrophobic nature of the petroleum coke proppant particles 102, there is resistance to the flow of water 108 into the hydraulic fracture 100, causing water to be (at least partially) repelled from the interface. As a result, hydrocarbon fluids that are produced via wellbores including hydraulic fractures with proppant packs formed at least in part from such oil-wet petroleum coke proppant particles will have a relatively low water-oil ratio as compared to hydrocarbon fluids that are produced via wellbores including non-coke, water-wet proppant, such as sand. Accordingly, the present disclosure increases the effectiveness of the overall production operation by producing higher-quality hydrocarbon fluids that have a higher ratio of oil than would be achieved according to conventional techniques.

FIGS. 2A and 2B illustrate two lab-scale tests that were performed to demonstrate the effectiveness of utilizing an oil-wet petroleum coke proppant pack (as opposed to a water-wet sand proppant pack) to increase the propensity for oil to enter the proppant pack. Specifically, FIG. 2A is a simplified schematic view of a first test that demonstrates the difference in water breakthrough time for a first burette 200 packed with oil-saturated petroleum coke 202 and a second burette 204 packed with oil-saturated sand 206. During the test, the two burettes 200 and 204 were packed with petroleum coke and sand, respectively, and then allowed to soak overnight in a field oil sample. A wool ball was also inserted at the bottom of each burette 200 and 204 to allow fluid flow without loss of the respective proppant. After the oil saturation process was complete, a fixed volume of brine (i.e., salted water) 208 was added to each burette 200 and 204. The stopper for each burette 200 and 204 was opened, and the flow of the brine 208 within each burette 200 and 204 was observed. The results showed that the second burette 204 including the oil-saturated sand 206 allowed water breakthrough within 5 minutes, while the first burette 200 including the oil-saturated petroleum coke 202 did not allow water breakthrough until 60 minutes had elapsed. Furthermore, the flow of brine through the second burette 204 including the oil-saturated sand 206 was around three times faster than the flow of brine through the first burette 200 including the oil-saturated petroleum coke 202.

On the other hand, FIG. 2B is a simplified schematic view of a second test that demonstrates the difference in oil breakthrough time for a first burette 210 packed with brine-saturated petroleum coke 212 and a second burette 214 packed with brine-saturated sand 216. During the test, the two burettes 210 and 214 were packed with petroleum coke and sand, respectively, and then allowed to soak overnight in a field brine sample. A wool ball was also inserted at the bottom of each burette 210 and 214 to allow fluid flow without loss of the respective proppant. After the brine saturation process was complete, an individual tube including a fixed volume of oil 218 was fluidically coupled to the base of each burette 210 and 214, with the liquid level in each tube of oil 218 being higher than the liquid level of the brine-saturated petroleum coke 212 and the brine-saturated sand 216 in the first and second burettes 210 and 214, respectively, to force the oil to flow into the burettes 210 and 214. The stopper for each burette 210 and 214 was then opened, and the flow of the oil 218 out of each tube and into the respective burette 210 or 214 was observed. The results showed that the first burette 210 including the brine-saturated petroleum coke 212 allowed oil breakthrough in 1.5 minutes, while the second burette 214 including the brine-saturated sand 216 did not allow oil breakthrough until 45 minutes had elapsed. Furthermore, the flow of oil through the first burette 210 including the brine-saturated petroleum coke 212 was around three times faster than the flow of oil through the second burette 214 including the brine-saturated sand 216.

The results of these tests clearly demonstrate that oil has a relatively high affinity for the oil-wet petroleum coke as compared to the water-wet sand, while water has a relatively low affinity for the oil-wet petroleum coke as compared to the water-wet sand. Therefore, due to the hydrophobic nature of the oil-wet petroleum coke, in combination with the relatively low capillary pressure for oil to pass into such oil-wet petroleum coke, a proppant pack formed at least in part from petroleum coke will result in hydraulic fractures that enable the flow of hydrocarbon fluids with reduced water-oil ratios. Moreover, it should be noted that this result is unexpected according to conventional practices within the industry. Specifically, an oil-wet proppant pack is expected to have a lower oil relative permeability than a water-wet proppant pack, which would conventionally be deemed as undesirable. However, the utilization of an oil-wet petroleum coke proppant pack according to the present disclosure still results in the preferential flow of oil into the proppant pack due to the relatively low capillary pressure for oil entry into the proppant pack, which advantageously and unexpectedly negates the impact of the lower oil relative permeability.

13 / 14

According to the present disclosure, two tests were conducted to differentiate the wettability properties of petroleum coke and sand. Specifically, the wettability properties of the petroleum coke and sand were measured via spontaneous imbibition testing using an Amott cell. During the first is shown in Table 1, where the wettability of a particular sample may be classified as strongly water-wet, weakly water-wet, mixed-wet, weakly oil-wet, or strongly oil-wet (with weakly water-wet, mixed-wet, and weakly oil-wet sometimes being described as "intermediate wettability").

TABLE 1

| | | Definition of Wettability based on USBM Index and Amott Index | | | |
|---|---|---|---|---|---|
| Index | Strongly Water-Wet | Weakly Water-Wet | Mixed-Wet | Weakly Oil-Wet | Strongly Oil-Wet |
| USBM (W) | $+1 < W < +\infty$ | $+0.3 \leq W \leq +1$ | $-0.3 < W < +0.3$ | $-1 \leq W \leq -0.3$ | $-\infty < W < -1$ |
| Amott Index for Water ($I_W$) | $+1$ | $0 < I_W < +1$ | $0 < I_W < +0.2$ | $I_O > I_W$ | $0$ |
| Amott Index for Oil ($I_O$) | $0$ | $I_O < I_W$ | $0 < I_O < +0.2$ | $0 < I_O < +1$ | $+1$ | test, the ability of oil to displace water (i.e., drainage) was measured for two petroleum coke samples (Coke 1 and Coke 2) and two sand samples (Sand 1 and Sand 2). To achieve this, each sample was placed into a sintered muffler, and the sintered mufflers were then loaded into saturation cells in which they were saturated with field brine. After the brine saturation process was complete, the sintered mufflers were individually placed in Amott cells containing dead crude oil. Within each Amott cell, the oil was in contact with the respective brine-saturated sample. The surrounding temperature was maintained at approximately 100° F. The volume of spontaneous water displacement was then measured as a function of time until stability was reached.

During the second test, the ability of water to displace oil (i.e., imbibition) was measured for two petroleum coke samples (Coke 3 and Coke 4) and two sand samples (Sand 3 and Sand 4). To achieve this, each sample was placed into a sintered muffler, and the sintered mufflers were then loaded into saturation cells in which they were saturated with dead crude oil. After the oil saturation process was complete, the sintered mufflers were individually placed in Amott cells containing field brine. Within each Amott cell, the brine was in contact with the respective oil-saturated sample. The surrounding temperature was maintained at approximately 150° F. The volume of spontaneous oil displacement was then measured as a function of time until stability was reached.

The results of these tests demonstrate that oil displaces water more easily within petroleum coke as opposed to sand. Therefore, petroleum coke is more oil-wet than sand. Moreover, the saturation measurements were then utilized to calculate pseudo Amott indices that quantify the wettability characteristics of the petroleum coke versus the sand. Specifically, the Amott index for water is defined by Equation (1); the Amott index for oil is defined by Equation (2); and the pseudo Amott index is defined by Equation (3).

$$I_W = \Delta S_2/(\Delta S_2 + \Delta S_3) \quad (1)$$

$$I_O = \Delta S_4/(\Delta S_4 + \Delta S_5) \quad (2)$$

$$W = I_W - I_O \quad (3)$$

In Equations (2) and (3), ΔS represents the change in saturation for the respective sample.

Furthermore, the definition of wettability based on the U.S. Bureau of Mines (USBM) index and the Amott index A summary of the results of the first test (i.e., for Sand 1, Sand 2, Coke 1, and Coke 2) and the results of the second test (i.e., for Sand 3, Sand 4, Coke 3, and Coke 4) is shown in Table 2.

TABLE 2

| | | Wettability Measurement Results for Petroleum Coke and Sand Samples | | |
|---|---|---|---|---|
| Sample 1 | Oil Saturation | Sample 2 | Water Saturation | Pseudo Amott Index |
| Sand 1 | 0.083 | Sand 3 | 0.435 | 0.352 |
| Sand 2 | 0.165 | Sand 4 | 0.599 | 0.434 |
| Coke 1 | 0.191 | Coke 3 | 0.394 | 0.203 |
| Coke 2 | 0.309 | Coke 4 | 0.348 | 0.039 |

Therefore, according to the results shown in Table 1, sand behaves as weakly water-wet, while petroleum coke behaves as mixed-wet. In other words, petroleum coke is oil-wet as compared to sand. More specifically, according to aspects and embodiments described herein, the oil-wet petroleum coke proppant particles include an Amott index for oil of at least 0.02 but potentially in a range from 0.02 to around 1.0 (e.g., around 0.02, 0.04, 0.06, 0.08, 0.1, 0.2, 0.3, 0.4, 0.5, 0.6, 0.7, 0.8, 0.9, or 1.0), an Amott index for water of at most 0.1 but potentially in a range from around 0.001 to 0.1 (e.g., around 0.001, 0.005, 0.01, 0.05, 0.1, 0.2, 0.3, 0.4, 0.5, 0.6, 0.7, 0.8, 0.9, or 1.0), and a pseudo Amott index of at most 0.35 but potentially in a range from around 0.001 to 0.35 (e.g., around 0.001, 0.005, 0.01, 0.05, 0.1, 0.15, 0.2, 0.25, 0.3, or 0.35). Moreover, as described further herein, the present disclosure provides optional methods for further increasing the oil wettability of petroleum coke prior to utilizing the petroleum coke as proppant.

Any suitable type(s) of petroleum coke may be used for the petroleum coke proppant particles described herein. For example, the petroleum coke proppant particles may include but are not limited to fluid coke particles, flexicoke particles, delayed coke particles, thermally post-treated coke particles, and/or pyrolysis coke particles. Moreover, in some embodiments, any or all of such petroleum coke proppant particles may be provided in the form of petroleum coke fines.

For embodiments in which flexicoke particles are utilized as at least a portion of the oil-wet petroleum coke proppant particles described herein, such flexicoke particles are produced via the FLEXICOKING™ process. Briefly, the FLEXICOKING™ process integrates a cracking reactor, a heater, and a gasifier into a common fluidized-solids (coke)

circulating system. A feed stream (of residua) is fed into a fluidized bed, along with a stream of hot recirculating material to the reactor. From the reactor, a stream containing coke is circulated to the heater vessel, where it is heated. The hot coke stream is sent from the heater to the gasifier, where it reacts with air and steam. The gasifier product gas, referred to as coke gas, containing entrained coke particles, is returned to the heater and cooled by cold coke from the reactor to provide a portion of the reactor heat requirement. A return stream of coke sent from the gasifier to the heater provides the remainder of the heat requirement. The coke meeting the heat requirement is then circulated to the reactor, and the feed stream is thermally cracked to produce light hydrocarbon liquids that are removed from the reactor and recovered using conventional fractionating equipment. Fluid coke is formed from the thermal cracking process and settles (deposits) onto the "seed" fluidized bed coke already present in the reactor. The resultant at least partially gasified coke is flexicoke. In some instances, the coke from the thermal cracking process deposits in a pattern that appears ring-like atop the surface of the seed coke. Flexicoke is continuously withdrawn from the system during normal FLEXICOKING™ processing (e.g., from the reactor or after it is streamed to the heater via an elutriator) to ensure that the system maintains particles of coke in a fluidizable particle size range. Accordingly, flexicoke is a readily available byproduct of the FLEXICOKING™ process.

The gasification process of FLEXICOKING™ results in substantial concentration of metals in the flexicoke product and additionally allows for operational desulfurization of sulfur from the flexicoke. The gasification can be minimized or maximized to influence the sulfur content (minimization=lower sulfur content). Accordingly, unlike cokes formed in other processes, flexicoke has a comparatively high metal content and a comparatively lower sulfur content that can be manipulated.

In various embodiments, the flexicoke particles may have a carbon content that is in a range from around 85 weight percent (wt %) to around 99 wt % (e.g., around 85, 86, 87, 88, 89, 90, 91, 92, 93, 94, 95, 96, 97, 98 or 99 wt %); a weight ratio of carbon to hydrogen that is in a range from around 80:1 to around 95:1 (e.g., around 80:1, 82:1, 84:1, 86:1, 88:1, 90:1, 92:1, 94:1 or 95:1); and an impurities content (i.e., a weight percent of all components other than carbon and hydrogen) that is in a range from around 1 wt % to around 10 wt % (e.g., around 1, 2, 3, 4, 5, 6, 7, 8, 9 or 10 wt %). Flexicoke also has a higher metal content than other cokes. In particular, the flexicoke particles may have a combined vanadium and nickel content that is in a range from around 3,000 parts per million (ppm) to around 45,000 ppm (e.g. around 3,000, 5,000, 10,000, 15,000, 20,000 ppm to 25,000, 25,000, 30,000, 35,000, 40,000, 45,000 ppm). In addition, the flexicoke particles may have a sulfur content that is in a range from 0 wt % to around 5 wt %, as well as a nitrogen content that is in a range from 0 wt % to around 3 wt %.

The apparent density of the flexicoke particles may be in a range from around 1.0 g/cm$^3$ to around 2.0 g/cm$^3$ (e.g., from around 1.0, 1.1, 1.2, 1.3, 1.4, 1.5 g/cm$^3$ to around 1.7, 1.8, 1.9, 2.0 g/cm$^3$). Traditional sand-based proppants generally have apparent densities of at least around 2.5 g/cm$^3$. Thus, the flexicoke particles have substantially lower apparent densities compared to non-coke, sand-based proppants, which is indicative of their comparably more effective transport and lower settling rates within a fracture formed as part of a hydraulic fracturing operation.

For embodiments in which fluid coke particles are utilized as at least a portion of the oil-wet petroleum coke proppant particles described herein, such fluid coke particles are obtained via a fluid coking process. Generally-speaking, flexicoke is considered to be a type (or subset) of fluid coke. Therefore, as expected, the fluid coke particles include a number of the same (or similar) characteristics as flexicoke. However, the fluid coking process may be manipulated in various ways to produce fluid coke particles having a number of distinctive characteristics. For example, the fluid coke particles may have a carbon content that is in a range from around 75 wt % to around 93 wt % (e.g., around 75, 76, 77, 78, 79, 80, 81, 82, 83, 84, 85, 86, 87, 88, 89, 90, 91, 92 or 93 wt %); a weight ratio of carbon to hydrogen that is in a range from around 30:1 to around 50:1 (e.g., around 30:1, 32:1, 34:1, 36:1, 38:1, 40:1, 42:1, 44:1, 46:1, 48:1 or 50:1); and an impurities content that is in a range from around 5 wt % to around 25 wt % (e.g., around 5, 7, 9, 11, 13, 15, 17, 19, 21, 23 or 25 wt %). The fluid coke particles may also have a sulfur content that is in a range from around 3 wt % to around 10 wt % (e.g., around 3, 4, 5, 6, 7, 8, 9 or 10 wt %), as well as a nitrogen content that is in a range from around 0.5 wt % to around 3.0 wt % (e.g., around 0.5, 1.0, 1.5, 2.0, 2.5 or 3.0 wt %. In addition, the apparent density of the fluid coke particles may be in a range from around 1.4 g/cm$^3$ to around 2.0 g/cm$^3$ (e.g., around 1.4, 1.5, 1.6, 1.7, 1.8, 1.9 or 2.0 g/cm$^3$).

For embodiments in which delayed coke particles are utilized as at least a portion of the oil-wet petroleum coke proppant particles described herein, such delayed coke particles are produced within a delayed coking unit via a delayed coking process. According to the delayed coking process, a preheated feedstock is introduced into a fractionator, where it undergoes a thermal cracking process in which long-chain hydrocarbons are split into shorter-chain hydrocarbons. The resulting lighter fractions are then removed as sidestream products. The fractionator bottoms, which include a recycle stream of heavy product, are heated in a furnace, which typically has an outlet temperature that is in a range from around 480° C. to around 515° C. (e.g., around 480, 485, 490, 500, 505, 510, 515° C., to name a few non-limiting examples). The heated feedstock then enters a reactor, referred to as a "coke drum," which typically operates at temperatures that are in a range from around 415° C. to around 450° C. (e.g., around 415, 420, 425, 430, 435, 440, 445, 450° C., to name a few non-limiting examples). Within the coke drum, the cracking reactions continue. The resulting cracked products then exit the coke drum as an overhead stream, while coke deposits on the inner surface of the coke drum. In general, this process is continued for a period of around 16 hours to around 24 hours (e.g., around 16, 17, 18, 19, 20, 21, 22, 23, 24 hours, to name a few non-limiting examples) to allow the coke drum to fill with coke. In addition, to allow the delayed coking unit to operate on a batch-continuous (or semi-continuous) basis, two or more coke drums are typically used. While one coke drum is on-line filling with coke, the other coke drum is being steam-stripped, cooled, decoked (e.g., via hydraulically cutting the deposited coke with water), pressure-checked, and warmed up. Moreover, the overhead stream exiting the coke drum enters the fractionator, where naphtha and heating oil fractions are recovered. The heavy recycle material is then typically combined with preheated fresh feedstock and recycled back into the process.

The delayed coke particles may exhibit the following properties: (1) a carbon content that is in a range from around 82 wt % to around 90 wt % (e.g., around 82, 83, 84, 85, 86, 87, 88, 89, 90 wt %); (2) a weight ratio of carbon to hydrogen that is in a range from around 15:1 to around 30:1 (e.g., around 15:1, 16:1, 18:1, 20:1, 22:1, 24:1, 26:1, 28:1 or 30:1); (3) a combined vanadium and nickel content that is in a range from around 100 ppm to around 3,000 ppm (e.g. 100, 500, 1,000, 1,500, 2,000, 2,500, 3,000 ppm); (4) a sulfur content that is in a range from around 2 wt % to around 8 wt % (e.g., around 2, 3, 4, 5, 6, 7, 8 wt %); and/or (5) a nitrogen content that is in a range from around 1 wt % to around 2 wt % (e.g., 1.0, 1.1, 1.2, 1.3, 1.4, 1.5, 1.6, 1.7, 1.8, 1.9 or 2.0 wt %), where such properties are measured on a dry, ash-free basis (or, in other words, not counting residual ash content and removing moisture before the analysis). In addition, the delayed coke particles may have a moisture content that is in a range from around 6 wt % to around 14 wt % (e.g., around 6, 7, 8, 9, 10, 11, 12, 13, 14 wt %) and a volatile matter content that is in a range from around 6 wt % to around 18 wt % (e.g., 6, 7, 8, 9, 10, 11, 12, 13, 14, 15, 16, 17, 18 wt %), as measured on an as-received basis. Moreover, the apparent density of the delayed coke particles may be in a range from around 1.0 g/cm$^3$ to around 1.7 g/cm$^3$ (e.g., around 1.0, 1.1, 1.2, 1.3, 1.4, 1.5, 1.6, 1.7 g/cm$^3$). Furthermore, the crush strength of the delayed coke particles may be comparable to the crush strengths of other types of petroleum coke particles.

For embodiments in which petroleum coke fines are utilized as at least a portion of the oil-wet petroleum coke proppant particles described herein, such petroleum coke fines may include wet flexicoke fines and/or dry flexicoke fines produced as a byproduct of the FLEXICOKING™ process. Additionally or alternatively, the petroleum coke fines may include sieved fluid coke, sieved flexicoke, sieved delayed coke, sieved thermally post-treated coke, and/or sieved pyrolysis coke. Additionally or alternatively, in some embodiments, the petroleum coke fines may include ground fluid coke, ground flexicoke, ground delayed coke, ground thermally post-treated coke, and/or ground pyrolysis coke. Moreover, any other suitable types of petroleum coke fines may be additionally or alternatively utilized.

With respect to the utilization of petroleum coke fines including wet and/or dry flexicoke fines as at least a portion of the oil-wet petroleum coke proppant particles described herein, such flexicoke fines are byproducts of the FLEXI-COKING™ process, which are collected as particles that were not recovered in the secondary cyclones of the heater within the flexicoker. More specifically, the particles are collected first in the tertiary cyclone as dry flexicoke fines, and the smaller particles that travel past the tertiary cyclone are then recovered in the venturi scrubber as wet flexicoke fines. While at least a portion of such flexicoke fines would typically be considered as waste, the present disclosure provides for the effective utilization of such flexicoke fines during hydraulic fracturing operations.

With respect to the utilization of petroleum coke fines including sieved fluid coke, sieved flexicoke, sieved delayed coke, sieved thermally post-treated coke, and/or sieved pyrolysis coke as at least a portion of the oil-wet petroleum coke proppant particles described herein, any suitable type(s) of filters, screens, and/or associated machinery may be utilized to separate any suitable type(s) of bulk petroleum coke granules into larger particles as well as smaller particles that are suitable for utilization as the petroleum coke fines. Furthermore, with respect to the utilization of petroleum coke fines including ground fluid coke, ground flexicoke, ground delayed coke, ground thermally post-treated coke, and/or ground pyrolysis coke as at least a portion of the oil-wet petroleum coke proppant particles described herein, any suitable type(s) of grinding/milling technique(s) may be used to produce such petroleum coke fines. For example, in some embodiments, petroleum coke granules may be processed using hammer milling techniques, jet milling techniques, ball milling techniques, or the like, where each of these techniques generally involves crushing or pulverizing the petroleum coke granules to a suitable size and shape. Moreover, those skilled in the art will appreciate that any number of other grinding, milling, or other processing techniques may be additionally or alternatively used, depending on the details of the particular implementation.

In various embodiments, the petroleum coke fines that may be utilized according to embodiments described herein include a particle size of at most 105 μm (140 mesh) or, in some cases, a particle size of at most 88 μm (170 mesh). Moreover, in various embodiments, such petroleum coke fines have an apparent density that is in a range from around 1.0 g/cm$^3$ to around 2.0 g/cm$^3$ (e.g. 1.0, 1.1, 1.2, 1.3, 1.4, 1.5, 1.6, 1.7, 1.8, 1.9, 2.0 g/cm$^3$), although the exact apparent density of the particles may vary depending on the specific type(s) of petroleum coke utilized. By comparison, sand generally has an apparent density of around 2.5 g/cm$^3$ or higher. Therefore, because the settling rate is proportional to the difference in density between the solid particles and the carrier fluid (as shown in expressions for both Stokes terminal settling velocity and Ferguson & Church settling velocity), such petroleum coke fines have a significantly lower settling rate than sand. As a result, the petroleum coke fines will perform better than proppant particles formed from sand in terms of transport capacity within the fractures created during a hydraulic fracturing operation.

According to embodiments described herein, one or more wettability alteration treatments may be performed on the petroleum coke proppant particles to increase the oil wettability of such particles. In various embodiments, such wettability alteration treatment(s) include stripping light hydrocarbons from the petroleum coke in the refinery. More specifically, in the case of fluid coke and/or flexicoke, the severity of the stripper within the reactor may be reduced by decreasing the temperature in the reactor by around 5° C. to around 15° C., which allows light hydrocarbons to be stripped from the petroleum coke. For example, if the standard temperature of the reactor is around 535° C., the temperature may be reduced to around 520° C. to around 530° C. to enable a higher percentage of light hydrocarbons to be stripped from the petroleum coke, thereby producing a petroleum coke product that is more oil-wet.

Additionally or alternatively, in various embodiments, such wettability alteration treatment(s) include coating the petroleum coke particles with wax and/or resin. In some such embodiments, the petroleum coke particles are coated with the wax and/or resin according to a spray drying process, although any other suitable technique may alternatively be utilized for the coating process. Furthermore, in various embodiments, the coating layer of the wax and/or resin is relatively thin (e.g., with a surface coating thickness that is in a range from around 5 μm to around 20 μm (e.g., 5, 6, 7, 8, 9, 10, 11, 12, 13, 14, 15, 16, 17, 18, 19 or 20 μm), as measured at the thickest coating location). As a result, the resulting coated petroleum coke proppant particles have a particle density that approximates the density of uncoated petroleum coke proppant particles.

For embodiments in which the petroleum coke particles (or at least a portion thereof) are coated with wax, a paraffin wax may be used for this purpose. Such paraffin wax may have a carbon number that is in a range from around 20 to around 40 (e.g., around 20, 22, 24, 26, 28, 30, 32, 34, 36, 38 or 40) and a molecular weight that is in a range from around 300 to around 550 (e.g., around 300, 320, 340, 360, 380, 400, 420, 440, 460, 480, 500, 520, 540 or 550). Additionally or alternatively, in some embodiments, a polyethylene (PE) wax may be used for this purpose, where PE is a type of polyolefin that is obtained from the polymerization of ethylene, and PE wax is typically formed using an ultra-lower-molecular-weight PE consisting of ethylene monomer chains. Moreover, PE wax has a relatively low density that is in a range from around 0.92 $g/cm^3$ to around 0.94 $g/cm^3$, which renders PE wax particularly suitable as a coating agent for the petroleum coke proppant particles described herein.

For embodiments in which the petroleum coke proppant particles (or at least a portion thereof) are coated with resin, such resin may include but is not limited to an epoxy, a methacrylate, a polyester, a vinyl ester, a furan, a furfural, an alcohol-furfural, a polyurethane, a urea-aldehyde, a phenol-aldehyde, or any combination thereof. In some embodiments, the resin has a density that is in a range from around 1.0 $g/cm^3$ to around 1.7 $g/cm^3$ (e.g., from around 1.0, 1.1, 1.2, 1.3, 1.4 $g/cm^3$ to around 1.5, 1.6, 1.7 $g/cm^3$. In various embodiments, the resin may be cured using heat, a curing agent, or a combination thereof, depending on the particular resin selected (among other factors). Suitable curing agents may include but are not limited to an amine, a polyamine, an organochlorine, an amide, a polyamide, a mercaptan, or any combination thereof.

Additionally or alternatively, in various embodiments, such wettability alteration treatment(s) include thermally post-treating the petroleum coke proppant particles (or at least a portion thereof) and then reacting the thermally post-treated coke particles with organosilanes. This wettability alteration treatment is particularly well-suited for delayed coke particles, although it may also be performed for other types of petroleum coke particles. Such thermal post-treatment process includes heat treating the petroleum coke particles at a specified temperature and duration within any suitable heater, kiln (e.g., rotary calciner), or similar equipment. The particular temperature and duration for the thermal post-treatment process may vary depending on the details of the particular implementation, including, for example, the parameters for the hydraulic fracturing operation and the characteristics of the corresponding subterranean formation. In various embodiments, the temperature may be in a range from around 400° C. to around 1200° C. (e.g., around 400° C. to around 500° C., around 500° C. to around 600° C. around 600° C. to around 700° C. around 700° C. to around 800° C., around 800° C. to around 900° C., around 900° C. to around 1000° C., around 1000° C. to around 1100° C. and around 1100° C. to around 1200° C., to name a few non-limiting examples), and the duration may be in a range from around 1 minute to around 24 hours (around 1 minute to around 1 hour, around 1 hour to around 2 hours, around 2 hours to around 4 hours, around 4 hours to around 8 hours, around 8 hours to around 12 hours, around 12 hours to around 16 hours, around 16 hours to around 20 hours and around 20 hours to around 24 hours, to name a few non-limiting examples). Moreover, the thermal post-treatment process may be performed in the presence of a gas, such as air, oxygen, steam, nitrogen, or any combination thereof.

In various embodiments, as part of the wettability alteration treatment, the resulting thermally post-treated petroleum coke proppant particles are then reacted with one or more organosilanes. Such organosilane(s) may include but are not limited to trichlorosilane with a normal alkyl group 6 to 12 carbons long, trimethoxysilane with a normal alkyl group 6 to 12 carbons long, and triethoxysilane with a normal alkyl group 6 to 12 carbons long.

Turning now to details regarding exemplary characteristics of the fracturing fluid in which the oil-wet petroleum coke proppant particles described herein may be employed, such fracturing fluid may include (in addition to the petroleum coke proppant particles) a flowable carrier fluid, one or more optional additives, and (optionally) one or more other types of proppant particles. In various embodiments, this fluid is formulated at the well site in a mixing process that is conducted concurrently with the pumping of the fracturing fluid into the wellbore during the hydraulic fracturing process. When the fracturing fluid is formulated at the well site, the petroleum coke proppant particles may be added in a manner similar to known methods for adding proppant to fracturing fluid.

The carrier fluid according to the present disclosure may be an aqueous carrier fluid including water or a nonaqueous carrier fluid that is substantially free of water. Aqueous carrier fluids may include, for example, fresh water, salt water (including seawater), treated water (e.g., treated production water), one or more other forms of aqueous fluid, or any combination thereof. One aqueous carrier fluid class is often referred to as slickwater, and the corresponding fracturing operations are often referred to as slickwater fracturing operations. Nonaqueous carrier fluids may include, for example, oil-based fluids (e.g., hydrocarbon, olefin, mineral oil), alcohol-based fluids (e.g., methanol), or any combination thereof. In various embodiments, the viscosity of the carrier fluid may be altered by foaming or gelling. Foaming may be achieved using, for example, air or other gases (e.g., $CO_2$, $N_2$), alone or in combination. Gelling may be achieved using, for example, guar gum (e.g., hydroxypropyl guar), cellulose, or other gelling agents, which may or may not be crosslinked using one or more crosslinkers, such as polyvalent metal ions or borate anions, among other suitable crosslinkers.

In some instances, the carrier fluid used in hydraulic fracturing of horizontal wells includes one or more aqueous carrier fluid types, particularly in light of the large volumes of fluid typically required for hydraulic fracturing (e.g., around 60,000 to around 1,000,000 gallons per wellbore (e.g., 60,000, 100,000, 200,000, 300,000, 400,000, 500,000, 600,000, 700,000, 800,000, 900,000 or 1,000,000 gallons per wellbore). The aqueous carrier fluid may or may not be gelled. The utilization of gelled aqueous carrier fluids (either crosslinked or un-crosslinked) may facilitate better proppant particle transport (i.e., reduce settling), as well as provide improved physical and chemical strength to withstand the temperatures, pressures, and shear stresses encountered by the fracturing fluid during a hydraulic fracturing operation. In some instances, the fracturing fluid includes an aqueous carrier fluid, which may or may not be foamed or gelled, and an acid (e.g., HCl) to further stimulate and enlarge pore areas of the matrix of fracture surfaces. It is to be appreciated that the low density of the petroleum coke proppant particles described herein may allow a reduction or elimination of the need to foam or gel the carrier fluid. In addition, certain fracturing fluids suitable for use according to embodiments described herein may contain one or more additives. Such additives may include but are not limited to one or more acids, one or more biocides, one or more breakers, one or more corrosion inhibitors, one or more crosslinkers, one or more friction reducers (e.g., polyacrylamides), one or more gels, one or more oxygen scavengers, one or more pH control additives, one or more scale inhibitors, one or more surfactants, one or more weighting agents, one or more inert solids, one or more fluid loss control agents, one or more emulsifiers, one or more emulsion thinners, one or more emulsion thickeners, one or more viscosifying agents, one or more foaming agents, one or more stabilizers, one or more chelating agents, one or more mutual solvents, one or more oxidizers, one or more reducers, one or more clay stabilizing agents, or any combination thereof.

Moreover, one or more types of surfactants may be added to the fracturing fluid according to embodiments described herein to enhance the ability of the oil-wet petroleum coke proppant particles to mix with the water within the fracturing fluid. In such embodiments, any suitable type(s) of surfactants may be utilized. As an example, standard dish soap may be used for this purpose. As additional examples, one or more anionic surfactants (e.g., advanced fatty acid salts, naphthenic acid salts, alkyl benzene sulfonates, or the like), one or more cationic surfactants (e.g., fatty amine hydrochloride, aliphatic imidazoline acetate, alkyl trimethyl ammonium chloride, or the like), one or more amphoteric surfactants (e.g., alkyl betaine or the like), one or more nonionic surfactants (e.g., fatty alcohol ethoxylates, alkylphenol ethoxylates, or the like), or some combination thereof, may be used for this purpose, depending on the details of the particular implementation.

Turning now to details regarding exemplary methods for utilizing the oil-wet petroleum coke proppant particles during hydraulic fracturing operations according to embodiments described herein, the present disclosure provides methods of hydraulic fracturing using a fracturing fluid including oil-wet petroleum coke proppant particles. Such petroleum coke proppant particles may be used, alone or in combination with one or more other types of proppants, during a hydraulic fracturing operation. That is, the petroleum coke proppant particles may form the entirety of a proppant pack or may form an integral part of a proppant pack. Other proppant types that may be utilized with the petroleum coke proppant particles described herein include but are not limited to sand (e.g., 100-mesh sand), other non-coke proppants (e.g., crushed granite and/or ceramic beads), and/or proppants formed from coal-derived coke (e.g., blast furnace coke and/or metallurgical coke). Proppants including other materials are also within the scope of the present disclosure, provided that any such selected proppants are able to maintain their integrity upon the removal of hydraulic pressure within an induced hydraulic fracture, such that around 80%, preferably around 90%, and more preferably around 95% or greater of the particle mass of the other proppant particles retains integrity when subjected to 5000 psi of stress, a condition also met by the petroleum coke proppant particles described herein. That is, both the oil-wet petroleum coke proppant particles described herein and any other type(s) of proppant particles utilized according to embodiments described herein are capable of maintaining mechanical integrity upon fracture closure, as such particles at least partially intermingle or otherwise associate to form functional proppant packs for a successful hydraulic fracturing operation.

The methods described herein include the preparation of the fracturing fluid, which is not considered to be particularly limited because the petroleum coke proppant particles are capable of transportation in dry form or as part of a wet slurry from a manufacturing site (e.g., a refinery or synthetic fuel plant). The dry and wet forms may be transported via truck or rail, and the wet forms may further be transported via pipelines. The transported dry and/or wet form of the petroleum coke proppant particles may be added to the carrier fluid, including the optional additives, at a production site, either directly into a wellbore or by pre-mixing in a hopper or other mixing equipment. For example, in some embodiments, slugs of the dry and/or wet form of the petroleum coke proppant particles may be added directly to the fracturing fluid (e.g., as it is introduced into the wellbore). In other embodiments, such as when other type(s) of proppant particles are combined with the petroleum coke proppant particles, a portion or all of the fracturing fluid may be pre-mixed at the production site, or each proppant type may be added directly to the fracturing fluid separately. Any other suitable mixing or adding of the petroleum coke proppant particles to produce a desired fracturing fluid composition may also be used, without departing from the scope of the present disclosure.

The methods of hydraulic fracturing suitable for use in one or more embodiments described herein involve pumping fracturing fluid including petroleum coke proppant particles at a relatively high pump rate into a subterranean formation to form hydraulic fractures within such subterranean formation. In various embodiments, this process is conducted one stage at a time along a wellbore. The stage is hydraulically isolated from any other stages which have been previously hydraulically fractured. In some embodiment, the stage of interest includes perforation clusters that allow the flow of fracturing fluid through the production casing string and into the formation. In some embodiments, the pump rate of the fracturing fluid during the hydraulic fracturing operation is at least around 20 barrels per minute (bbl/min) (0.05 cubic meters per second ($m^3$/s)), preferably at least around 30 bbl/min (0.08 $m^3$/s), and more preferably in excess of 50 bbl/min (0.14 $m^3$/s) and at most 1000 bbl/min (2.73 $m^3$/s) at one or more time durations during the hydraulic fracturing operation (e.g., the rate may be constant, steadily increased, or pulsed). These high rates may, in some embodiments, be utilized after around 10% of the entire volume of fracturing fluid to be pumped into the subterranean formation has already been injected. That is, at the early periods of the hydraulic fracturing operation, the pump rate may be lower and as hydraulic fractures begin to form, the pump rate may be increased. Generally, the average pump rate of the fracturing fluid throughout the operation may be around 10 bbl/min (0.03 $m^3$/s), preferably around 15 bbl/min (0.04 $m^3$/s), and more preferably in excess of 25 bbl/min (0.07 $m^3$/s) and at most 250 bbl/min (0.68 $m^3$/s). Typically, the pump rate of the fracturing fluid during a hydraulic fracturing operation for more than 30% of the time required to complete the hydraulic fracturing of a particular stage is in the range of around 20 bbl/min (0.05 $m^3$/s) to around 150 bbl/min (0.41 $m^3$/s), or around 40 bbl/min (0.11 $m^3$/s) to around 120 bbl/min (0.33 $m^3$/s), or around 40 bbl/min (0.11 $m^3$/s) to around 100 bbl/min (0.27 $m^3$/s).

In various embodiments, the methods of hydraulic fracturing described herein may be performed such that the concentration of the petroleum coke proppant particles (and any other type(s) of proppant particles) within the injected fracturing fluid is altered in real-time or on-the-fly while the hydraulic fracturing operation is being performed, such that the hydraulic pressure is maintained in the subterranean formation and the hydraulic fractures. For example, in some embodiments, the initially-injected fracturing fluid is injected at a relatively low pump rate and includes around 1 weight percent (wt %) proppant particles (i.e., including the petroleum coke proppant particles and (optionally) one or more other types of proppant particles) based on the total weight of the fracturing fluid (i.e., including the carrier fluid, the petroleum coke proppant particles, any other type(s) of proppant particles, and any additives). As one or more hydraulic fractures begin to form and grow, the pump rate may be increased; and the concentration of the proppant particles may be increased in a stepwise fashion (with or without a corresponding stepwise increase in pump rate), with a maximum concentration of total proppant particles reaching around 2.5 wt % to around 20 wt %, for example, based on the total weight of the fracturing fluid. For example, the maximum concentration of total proppant particles may reach at least 2.5 wt %, preferably around 8 wt %, and more preferably around 16 wt %. Moreover, in some embodiments, all of the proppant particles are petroleum coke particles. In other embodiments, at one or more time periods during the hydraulic fracturing operation, at least around 2 wt % to around 100 wt % of the proppant particles suspended within the fracturing fluid are petroleum coke particles, such as at least around 2 wt %, preferably around 15 wt %, more preferably around 25 wt %, and even more preferably 100 wt %.

In various embodiments, the petroleum coke proppant particles are introduced into the subterranean formation during at least a portion of the pad phase of the fracturing operation to allow the petroleum coke proppant particles to travel with the fracturing fluid into the tips (or at least within proximity to the tips) of the formed hydraulic fractures. In such embodiments, the petroleum coke proppant particles may also be introduced into the subterranean formation during at least a portion of the later phases of the fracturing operation such that the later-introduced slurry of fracturing fluid and petroleum coke proppant particles continue to displace the earlier-introduced slurry of fracturing fluid and petroleum coke proppant particles further away from the wellbore. Moreover, in some embodiments, the petroleum coke proppant particles are introduced into the subterranean formation throughout the hydraulic fracturing operation, either continuously or intermittently. In such embodiments, the ratio of petroleum coke proppant particles to other type(s) of proppant particles, if any, within the fracturing fluid may be maintained at a steady (or substantially steady) value, or the ratio may be modified as the hydraulic fracturing operation progresses.

The hydraulic fracturing methods described herein may be performed in drilled lateral, vertical, and/or tortuous hydrocarbon-producing wellbores. Such wellbores may be drilled into various types of unconventional formations, including but not limited to tight sandstone formations, tight carbonate formations, shale gas formations, coal bed methane formations, and tight oil formations. The wellbores are typically completed using metal (e.g., steel) casing strings that are cemented into the subterranean formation. To contact the subterranean formation, a number of perforations are created through the production casing string and the cement along a section to be treated, in which case the wellbore is usually referred to as a plug and perforated ("plug-and-perf") cased-hole completion. Alternative completion techniques may be used without departing from the scope of the present disclosure, but in each completion technique, a finite length of the wellbore is exposed for hydraulic fracturing and injection of fracturing fluid. This finite section is referred to herein as a "stage." In plug-and-perf completions, the stage length may be based on a distance over which the production casing string has been perforated, and may be in the range from around 10 feet (ft) (3 meters (m)) to around 2,000 ft (610 m), for example, and more generally in the range from around 100 ft (30.5 m) to around 300 ft (91.4 m). The stage is isolated (e.g., using a sliding sleeve or frac plug and ball) such that pressurized fracturing fluid from the surface can flow through the perforations and into the subterranean formation to generate one or more hydraulic fractures in only the stage area. Perforation clusters may be used to facilitate the initiation of multiple hydraulic fractures. For example, perforation clusters may be made in sections of the stage that are around 1 ft (0.3 m) to around 3 ft (0.9 m) in length and spaced apart by around 10 ft (3 m) to around 50 ft (15.2 m).

For each linear foot of the stage, at least around 6 barrels (0.95 cubic meters ($m^3$)), preferably at least around 24 barrels (3.8 $m^3$), and more preferably at least around 60 barrels (9.5 $m^3$) and at most around 6,000 barrels (953.9 $m^3$) of fracturing fluid may be injected to grow the hydraulic fractures. In certain embodiments, for each linear foot of the stage, at least around 0.3 barrels (0.05 $m^3$), preferably at least around 1.1 barrels (0.2 $m^3$), and more preferably at least around 2.8 barrels (0.4 $m^3$) and at most around 285 barrels (45.3 $m^3$) of proppant particles (i.e., including the petroleum coke proppant particles and any other type(s) of proppant particles) may be injected to prop the hydraulic fractures.

Certain commercial operations, such as commercial shale fracturing operations, may be particularly suitable for hydraulic fracturing using the oil-wet petroleum coke proppant particles and methods described herein, as the mass of total proppant particles required per stage in such operations can be quite large and substantial economic benefit may be derived by using the petroleum coke proppant particles described herein to prop extended regions of the hydraulic fractures. The cost of petroleum coke is generally the cost of sand and other non-coke proppants, which provides a significant economic benefit. Indeed, in some instances, a stage in a shale formation may be designed to require at least around 30,000, preferably around 100,000, and more preferably around 250,000 pounds (mass) of total proppant particles. In such cases, economic and performance benefit may be optimized when at least around 5% but preferably more than around 25% of the total proppant particle mass includes the petroleum coke proppant particles described herein.

Furthermore, in general, multiple stages of the wellbore are isolated, and hydraulic fracturing is performed for each stage. The petroleum coke proppant particles described herein may be used in any number of the stages, including, for example, at least 2 stages, preferably at least 10 stages, and more preferably at least 20 stages.

Turning now to details of exemplary methods according to the present disclosure, FIG. 3 is a process flow diagram of an exemplary method 300 for producing hydrocarbon fluids with a reduced water-oil ratio by utilizing petroleum coke proppant particles during hydraulic fracturing in accordance with the present disclosure. The exemplary method 300 begins at block 302, at which petroleum coke proppant particles with an Amott index for oil of at least 0.02 (e.g., around 0.02, 0.05, 0.1, 0.2, 0.3, 0.4, 0.5, 0.6, 0.7, 0.8, 0.9 or 1.0), an Amott index for water of at most 0.1 (e.g., around 0.01, 0.02, 0.03, 0.04, 0.05, 0.06, 0.07, 0.08, 0.09 or, 0.1), and a pseudo Amott index of at most 0.35 (e.g., around 0.01, 0.05, 0.1, 0.15, 0.2, 0.25, 0.3, or 0.35) are produced. In various embodiments, this includes performing one or more wettability alteration treatments on the petroleum coke proppant particles. In some such embodiments, this includes, during the generation of the petroleum coke proppant particles within a reactor, decreasing the temperature in the reactor by 5° C. to 15° C. to strip at least a portion of the light hydrocarbons from the petroleum coke proppant particles. Additionally or alternatively, in some such embodiments, this includes coating the petroleum coke proppant particles with a wax, where such wax may include but is not limited to a paraffin wax and/or a PE wax. Additionally or alternatively, in some such embodiments, this includes coating the petroleum coke proppant particles with a resin, where such resin may include but is not limited to an epoxy, a methacrylate, a polyester, a vinyl ester, a furan, a furfural, an alcohol-furfural, a polyurethane, a urea-aldehyde, a phenol-aldehyde, or some combination thereof. Additionally or alternatively, in some such embodiments, this includes thermally post-treating the petroleum coke proppant particles and then reacting the petroleum coke proppant particles with an organosilane. In such embodiments, the petroleum coke proppant particles may be thermally post-treated at a temperature in a range from 400° C. to 1200° C. (e.g., around 400° C. to around 500° C., around 500° C. to around 600° C., around 600° C. to around 700° C., around 700° C. to around 800° C., around 800° C. to around 900° C., around 900° C. to around 1000° C., around 1000° C. to around 1100° C. and around 1100° C. to around 1200° C., to name a few non-limiting examples) for a duration in a range from 1 minute to 24 hours (around 1 minute to around 1 hour, around 1 hour to around 2 hours, around 2 hours to around 4 hours, around 4 hours to around 8 hours, around 8 hours to around 12 hours, around 12 hours to around 16 hours, around 16 hours to around 20 hours and around 20 hours to around 24 hours, to name a few non-limiting examples). Moreover, in such embodiments, the organosilane may include but is not limited to trichlorosilane with a normal alkyl group 6 to 12 carbons long, trimethoxysilane with a normal alkyl group 6 to 12 carbons long, and/or triethoxysilane with a normal alkyl group 6 to 12 carbons long.

In some embodiments, the petroleum coke proppant particles include fluid coke, flexicoke, delayed coke, thermally post-treated coke, pyrolysis coke, or some combination thereof. Moreover, in some embodiments, the petroleum coke proppant particles include petroleum coke fines. In some such embodiments, the petroleum coke fines include wet flexicoke fines, dry flexicoke fines, or some combination thereof. Additionally or alternatively, in some such embodiments, the petroleum coke fines include sieved fluid coke, sieved flexicoke, sieved delayed coke, sieved thermally post-treated coke, sieved pyrolysis coke, or some combination thereof. Additionally or alternatively, in some such embodiments, the petroleum coke fines include ground fluid coke, ground flexicoke, ground delayed coke, ground thermally post-treated coke, ground pyrolysis coke, or some combination thereof.

At block 304, for each stage of a hydrocarbon well (or for each of at least a portion of such stages), a fracturing fluid including a carrier fluid and the petroleum coke proppant particles is introduced into a subterranean formation via a wellbore of the hydrocarbon well. In some embodiments, this includes, for each stage, introducing the fracturing fluid into the subterranean formation during at least a portion of the pad phase of the hydraulic fracturing operation, prior to the introduction of a second fracturing fluid including carrier fluid and second proppant particles that do not include petroleum coke into the subterranean formation. In some embodiments, the fracturing fluid itself includes the second proppant particles that do not include petroleum coke, and, in such embodiments, the method may include, for each stage (or for each of at least a portion of such stages), introducing the fracturing fluid including both the petroleum coke proppant particles and the second proppant particles into the subterranean formation during at least a portion of the pad phase of the hydraulic fracturing operation, as well as during at least a portion of the remainder of the hydraulic fracturing operation. Moreover, in such embodiments, the second proppant particles may include sand particles, coal-derived coke particles (e.g., blast furnace coke particles and/or metallurgical coke particles), and/or any other suitable types of commercially-available proppants that are not formed from petroleum coke.

In some embodiments, the carrier fluid is an aqueous carrier fluid including water. In other embodiments, the carrier fluid is a nonaqueous carrier fluid that is substantially free of water. Moreover, in some embodiments, the fracturing fluid also includes one or more acids, one or more biocides, one or more breakers, one or more corrosion inhibitors, one or more crosslinkers, one or more friction reducers (e.g., polyacrylamides), one or more gels, one or more oxygen scavengers, one or more pH control additives, one or more scale inhibitors, one or more surfactants, one or more weighting agents, one or more inert solids, one or more fluid loss control agents, one or more emulsifiers, one or more emulsion thinners, one or more emulsion thickeners, one or more viscosifying agents, one or more foaming agents, one or more stabilizers, one or more chelating agents, one or more mutual solvents, one or more oxidizers, one or more reducers, one or more clay stabilizing agents, or any combination thereof.

At block 306, hydrocarbon fluids are produced via the wellbore. In various embodiments, the produced hydrocarbon fluids have a water-oil ratio that is decreased by at least 5% as compared to the expected water-oil ratio of the produced hydrocarbon fluids if the fracturing fluid did not include the petroleum coke proppant particles. Therefore, the utilization of the oil-wet petroleum coke proppant particles during hydraulic fracturing operations according to the method 300 of FIG. 3 advantageously provides for the production of higher-quality hydrocarbon fluids as compared to the hydrocarbon fluids produced in response to hydraulic fracturing operations that utilize other types of proppants, such as 100-mesh sand.

FIG. 4 is a process flow diagram of an exemplary method 400 for producing and utilizing oil-wet petroleum coke proppant particles in accordance with the present disclosure. The exemplary method 400 begins at block 402, at which oil-wet petroleum coke proppant particles are produced by, during the generation of petroleum coke within a reactor, decreasing the temperature in the reactor by from 5° C. to 15° C. to strip at least a portion of the light hydrocarbons from the petroleum coke, providing the oil-wet petroleum coke proppant particles with an Amott index for oil of at least 0.02, an Amott index for water of at most 0.1, and a pseudo Amott index of at most 0.35. Moreover, at block 404, a fracturing fluid including a carrier fluid and the oil-wet petroleum coke proppant particles is introduced into a subterranean formation.

FIG. 5 is a process flow diagram of another exemplary method 500 for producing and utilizing oil-wet petroleum coke proppant particles in accordance with the present disclosure. The exemplary method 500 begins at block 502, at which oil-wet petroleum coke proppant particles are produced by coating petroleum coke proppant particles with wax and/or resin, providing the oil-wet petroleum coke proppant particles with an Amott index for oil of at least 0.02 (e.g., around 0.02, 0.05, 0.1, 0.2, 0.3, 0.4, 0.5, 0.6, 0.7, 0.8, 0.9 or 1.0), an Amott index for water of at most 0.1 (e.g., around 0.01, 0.02, 0.03, 0.04, 0.05, 0.06, 0.07, 0.08, 0.09 or, 0.1), and a pseudo Amott index of at most 0.35 (e.g., around 0.01, 0.05, 0.1, 0.15, 0.2, 0.25, 0.3, or 0.35). In various embodiments, the wax includes a paraffin wax or a PE wax.

In various embodiments, the resin includes an epoxy, a methacrylate, a polyester, a vinyl ester, a furan, a furfural, an alcohol-furfural, a polyurethane, a urea-aldehyde, a phenol-aldehyde, or some combination thereof. In some embodiments, the petroleum coke proppant particles are coated with the wax and/or the resin according to a spray drying process. Furthermore, at block 504, a fracturing fluid including a carrier fluid and the oil-wet petroleum coke proppant particles is introduced into a subterranean formation.

FIG. 6 is a process flow diagram of another exemplary method 600 for producing and utilizing oil-wet petroleum coke proppant particles in accordance with the present disclosure. The exemplary method 600 begins at block 602, at which oil-wet petroleum coke proppant particles are produced by thermally post-treating petroleum coke proppant particles and then reacting the petroleum coke proppant particles with an organosilane, providing the oil-wet petroleum coke proppant particles with an Amott index for oil of at least 0.02 (e.g., around 0.02, 0.05, 0.1, 0.2, 0.3, 0.4, 0.5, 0.6, 0.7, 0.8, 0.9 or 1.0), an Amott index for water of at most 0.1 (e.g., around 0.01, 0.02, 0.03, 0.04, 0.05, 0.06, 0.07, 0.08, 0.09 or, 0.1), and a pseudo Amott index of at most 0.35 (e.g., around 0.01, 0.05, 0.1, 0.15, 0.2, 0.25, 0.3, or 0.35). In various embodiments, this includes thermally post-treating the petroleum coke proppant particles at a temperature in a range from 400° C. to 1200° C. (e.g., around 400° C. to around 500° C., around 500° C. to around 600° C., around 600° C. to around 700 CC, around 700° C. to around 800° C., around 800° C. to around 900° C., around 900° C. to around 1000° C., around 1000° C. to around 1100° C. and around 1100° C. to around 1200° C., to name a few non-limiting examples) for a duration in a range from 1 minute to 24 hours (around 1 minute to around 1 hour, around 1 hour to around 2 hours, around 2 hours to around 4 hours, around 4 hours to around 8 hours, around 8 hours to around 12 hours, around 12 hours to around 16 hours, around 16 hours to around 20 hours and around 20 hours to around 24 hours, to name a few non-limiting examples). In various embodiments, the organosilane may include but is not limited to trichlorosilane with a normal alkyl group 6 to 12 carbons long, trimethoxysilane with a normal alkyl group 6 to 12 carbons long, triethoxysilane with a normal alkyl group 6 to 12 carbons long, or any combination thereof. In addition, at block 604, a fracturing fluid including a carrier fluid and the oil-wet petroleum coke proppant particles is introduced into a subterranean formation.

For any (or all) of the methods 300, 400, 500, and/or 600, the fracturing fluid may be introduced into the subterranean formation via a stage of a hydrocarbon well, and the corresponding method(s) may further include repeating the introduction of the fracturing fluid into the subterranean formation for each additional stage of the hydrocarbon well (or for at least a portion of such stages). In such embodiments, the corresponding method(s) may also include producing hydrocarbon fluids from the subterranean formation via a wellbore of the hydrocarbon well, where the water-oil ratio of the hydrocarbon fluids is decreased by at least 5% as compared to the expected water-oil ratio of the hydrocarbon fluids if the fracturing fluid did not include the oil-wet petroleum coke proppant particles.

In various embodiments, any (or all) of the methods 300, 400, 500, and/or 600 include introducing the fracturing fluid into the subterranean formation during at least a portion of the pad phase of the hydraulic fracturing operation, prior to the introduction of a second fracturing fluid including the carrier fluid and second proppant particles that do not include petroleum coke into the subterranean formation.

Alternatively, in various embodiments, the fracturing fluid itself includes the second proppant particles, and any (or all) of the methods 300, 400, 500, and/or 600 include introducing the fracturing fluid including both the oil-wet petroleum coke proppant particles and the second proppant particles into the subterranean formation during at least a portion of the pad phase of the hydraulic fracturing operation, as well as during at least a portion of the remainder of the hydraulic fracturing operation.

Those skilled in the art will appreciate that the exemplary methods 300, 400, 500, and 600 of FIGS. 3, 4, 5, and 6, respectively, are susceptible to modification without altering the technical effect provided by the present disclosure. For example, in some embodiments, one or more blocks may be omitted from the method 300, 400, 500, and/or 600, and/or one or more blocks may be added to the method 300, 400, 500, and/or 600, depending on the details of the particular implementation. In practice, the exact manner in which the method 300, 400, 500, and/or 600 is implemented will depend, at least in part, on the details of the specific implementation.

This disclosure can include one or more of the following non-limiting aspects and/or embodiments:

A1. A method for producing hydrocarbon fluids via a hydrocarbon well, including: providing petroleum coke proppant particles having an Amott index for oil of at least 0.02, an Amott index for water of at most 0.1, and a pseudo Amott index of at most 0.35; for each of a number of stages of a hydrocarbon well, introducing a fracturing fluid including a carrier fluid and the petroleum coke proppant particles into a subterranean formation via a wellbore of the hydrocarbon well; and producing hydrocarbon fluids from the subterranean formation via the wellbore of the hydrocarbon well.

A2. The method of A1, where a water-oil ratio of the hydrocarbon fluids is decreased by at least 5% as compared to an expected water-oil ratio of the hydrocarbon fluids if the fracturing fluid did not include the petroleum coke proppant particles.

A3. The method of A1 or A2, including providing the petroleum coke proppant particles by performing at least one wettability alteration treatment on the petroleum coke proppant particles.

A4. The method of A3, including performing the at least one wettability alteration treatment on the petroleum coke proppant particles by, during a generation of the petroleum coke proppant particles within a reactor, decreasing a temperature in the reactor by 5° C. to 15° C. to strip at least a portion of light hydrocarbons from the petroleum coke proppant particles.

A5. The method of A3, including performing the at least one wettability alteration treatment on the petroleum coke proppant particles by coating the petroleum coke proppant particles with a wax.

A6. The method of A5, where the wax includes at least one of a paraffin wax and a PE wax.

A7. The method of A3, including performing the at least one wettability alteration treatment on the petroleum coke proppant particles by coating the petroleum coke proppant particles with a resin.

A8. The method of A7, where the resin includes at least one of an epoxy, a methacrylate, a polyester, a vinyl ester, a furan, a furfural, an alcohol-furfural, a polyurethane, a urea-aldehyde, and a phenol-aldehyde.

A9. The method of A3, including performing the at least one wettability alteration treatment on the petroleum coke proppant particles by: thermally post-treating the petroleum coke proppant particles; and reacting the petroleum coke proppant particles with an organosilane.

A10. The method of A9, including thermally post-treating the petroleum coke proppant particles at a temperature in a range from 400° C. to 1200° C. for a duration in a range from 1 minute to 24 hours.

A11. The method of A9 or A10, where the organosilane includes at least one of trichlorosilane with a normal alkyl group 6 to 12 carbons long, trimethoxysilane with a normal alkyl group 6 to 12 carbons long, and triethoxysilane with a normal alkyl group 6 to 12 carbons long.

A12. The method of any of A1 to A11, where the petroleum coke proppant particles include at least one of fluid coke, flexicoke, delayed coke, thermally post-treated coke, and pyrolysis coke.

A13. The method of any of A1 to A12, where the petroleum coke proppant particles include petroleum coke fines.

A14. The method of A13, where the petroleum coke fines include at least one of wet flexicoke fines and dry flexicoke fines.

A15. The method of A13, where the petroleum coke fines include at least one of sieved fluid coke, sieved flexicoke, sieved delayed coke, sieved thermally post-treated coke, and sieved pyrolysis coke.

A16. The method of A13, where the petroleum coke fines include at least one of ground fluid coke, ground flexicoke, ground delayed coke, ground thermally post-treated coke, and ground pyrolysis coke.

A17. The method of any of A1 to A16, including, for each of the number of stages, introducing the fracturing fluid into the subterranean formation during a pad phase of a hydraulic fracturing operation, prior to an introduction of a second fracturing fluid including the carrier fluid and second proppant particles that do not include petroleum coke into the subterranean formation.

A18. The method of A17, where the second proppant particles include at least one of sand and coal-derived coke particles.

A19. The method of any of A1 to A18, where the fracturing fluid further includes second proppant particles that do not include petroleum coke, and where the method includes, for each of the number of stages, introducing the fracturing fluid including the petroleum coke proppant particles and the second proppant particles into the subterranean formation during a pad phase of a hydraulic fracturing operation, as well as throughout a remainder of the hydraulic fracturing operation.

A20. The method of A19, where the second proppant particles include at least one of sand and coal-derived coke particles.

A21. The method of any of A1 to A20, where the carrier fluid includes water.

A22. The method of any of A1 to A20, where the carrier fluid is substantially free of water.

A23. The method of any of A1 to A22, where the fracturing fluid further includes at least one of an acid, a biocide, a breaker, a corrosion inhibitor, a crosslinker, a friction reducer, a gel, an oxygen scavenger, a pH control additive, a scale inhibitor, a surfactant, a weighting agent, an inert solid, a fluid loss control agent, an emulsifier, an emulsion thinner, an emulsion thickener, a viscosifying agent, a foaming agent, a stabilizer, a chelating agent, a mutual solvent, an oxidizer, a reducer, and a clay stabilizing agent.

B1. A method for producing and utilizing oil-wet petroleum coke proppant particles, including: providing oil-wet petroleum coke proppant particles by, during a generation of petroleum coke within a reactor, decreasing a temperature in the reactor by 5° C. to 15° C. to strip at least a portion of light hydrocarbons from the petroleum coke, providing the oil-wet petroleum coke proppant particles with an Amott index for oil of at least 0.02, an Amott index for water of at most 0.1, and a pseudo Amott index of at most 0.35; and introducing a fracturing fluid including a carrier fluid and the oil-wet petroleum coke proppant particles into a subterranean formation.

B2. The method of B1, where the fracturing fluid is introduced into the subterranean formation via a stage of a hydrocarbon well, and where the method further includes repeating the introduction of the fracturing fluid into the subterranean formation for each of a number of additional stages of the hydrocarbon well.

B3. The method of B2, further including producing hydrocarbon fluids from the subterranean formation via a wellbore of the hydrocarbon well, where a water-oil ratio of the hydrocarbon fluids is decreased by at least 5% as compared to an expected water-oil ratio of the hydrocarbon fluids if the fracturing fluid did not include the oil-wet petroleum coke proppant particles.

B4. The method of any of B1 to B3, where the oil-wet petroleum coke proppant particles include at least one of fluid coke, flexicoke, delayed coke, thermally post-treated coke, and pyrolysis coke.

B5. The method of any of B1 to B4, where the oil-wet petroleum coke proppant particles include petroleum coke fines.

B6. The method of any of B1 to B5, including introducing the fracturing fluid into the subterranean formation during a pad phase of a hydraulic fracturing operation, prior to an introduction of a second fracturing fluid including the carrier fluid and second proppant particles that do not include petroleum coke into the subterranean formation.

B7. The method of any of B1 to B6, where the fracturing fluid further includes second proppant particles that do not include petroleum coke, and where the method includes introducing the fracturing fluid including the oil-wet petroleum coke proppant particles and the second proppant particles into the subterranean formation during a pad phase of a hydraulic fracturing operation, as well as throughout a remainder of the hydraulic fracturing operation.

C1. A method for producing and utilizing oil-wet petroleum coke proppant particles, including: providing oil-wet petroleum coke proppant particles by coating petroleum coke proppant particles with at least one of a wax and a resin, providing the oil-wet petroleum coke proppant particles with an Amott index for oil of at least 0.02, an Amott index for water of at most 0.1, and a pseudo Amott index of at most 0.35; and introducing a fracturing fluid including a carrier fluid and the oil-wet petroleum coke proppant particles into a subterranean formation.

C2. The method of C1, where the wax includes at least one of a paraffin wax and a PE wax.

C3. The method of C1 or C2, where the resin includes at least one of an epoxy, a methacrylate, a polyester, a vinyl ester, a furan, a furfural, an alcohol-furfural, a polyurethane, a urea-aldehyde, and a phenol-aldehyde.

C4. The method of any of C1 to C3, including coating the petroleum coke proppant particles with the at least one of the wax and the resin according to a spray drying process.

C5. The method of any of C1 to C4, where the fracturing fluid is introduced into the subterranean formation via a stage of a hydrocarbon well, and where the method further includes repeating the introduction of the fracturing fluid into the subterranean formation for each of a number of additional stages of the hydrocarbon well.

C6. The method of C5, further including producing hydrocarbon fluids from the subterranean formation via a wellbore of the hydrocarbon well, where a water-oil ratio of the hydrocarbon fluids is decreased by at least 5% as compared to an expected water-oil ratio of the hydrocarbon fluids if the fracturing fluid did not include the oil-wet petroleum coke proppant particles.

C7. The method of any of C1 to C6, where the oil-wet petroleum coke proppant particles include at least one of fluid coke, flexicoke, delayed coke, thermally post-treated coke, and pyrolysis coke.

C8. The method of any of C1 to C7, where the oil-wet petroleum coke proppant particles include petroleum coke fines.

C9. The method of any of C1 to C8, including introducing the fracturing fluid into the subterranean formation during a pad phase of a hydraulic fracturing operation, prior to an introduction of a second fracturing fluid including the carrier fluid and second proppant particles that do not include petroleum coke into the subterranean formation.

C10. The method of any of C1 to C9, where the fracturing fluid further includes second proppant particles that do not include petroleum coke, and where the method includes introducing the fracturing fluid including the oil-wet petroleum coke proppant particles and the second proppant particles into the subterranean formation during a pad phase of a hydraulic fracturing operation, as well as throughout a remainder of the hydraulic fracturing operation.

D1. A method for producing and utilizing oil-wet petroleum coke proppant particles, including: providing oil-wet petroleum coke proppant particles by thermally post-treating petroleum coke proppant particles and reacting the petroleum coke proppant particles with an organosilane, providing the oil-wet petroleum coke proppant particles with an Amott index for oil of at least 0.02, an Amott index for water of at most 0.1, and a pseudo Amott index of at most 0.35; and introducing a fracturing fluid including a carrier fluid and the oil-wet petroleum coke proppant particles into a subterranean formation.

D2. The method of D1, including thermally post-treating the petroleum coke proppant particles at a temperature in a range from 400° C. to 1200° C.

D3. The method of D1 or D2, including thermally post-treating the petroleum coke proppant particles for a duration in a range from 1 minute to 24 hours.

D4. The method of any of D1 to D3, where the organosilane includes at least one of trichlorosilane with a normal alkyl group 6 to 12 carbons long, trimethoxysilane with a normal alkyl group 6 to 12 carbons long, and triethoxysilane with a normal alkyl group 6 to 12 carbons long.

D5. The method of any of D1 to D4, where the fracturing fluid is introduced into the subterranean formation via a stage of a hydrocarbon well, and where the method further includes repeating the introduction of the fracturing fluid into the subterranean formation for each of a number of additional stages of the hydrocarbon well.

D6. The method of D5, further including producing hydrocarbon fluids from the subterranean formation via a wellbore of the hydrocarbon well, where a water-oil ratio of the hydrocarbon fluids is decreased by at least 5% as compared to an expected water-oil ratio of the hydrocarbon fluids if the fracturing fluid did not include the oil-wet petroleum coke proppant particles.

D7. The method of any of D1 to D6, where the oil-wet petroleum coke proppant particles include at least one of fluid coke, flexicoke, delayed coke, thermally post-treated coke, and pyrolysis coke.

D8. The method of any of D1 to D7, where the oil-wet petroleum coke proppant particles include petroleum coke fines.

D9. The method of any of D1 to D8, including introducing the fracturing fluid into the subterranean formation during a pad phase of a hydraulic fracturing operation, prior to an introduction of a second fracturing fluid including the carrier fluid and second proppant particles that do not include petroleum coke into the subterranean formation.

D10. The method of any of D1 to D9, where the fracturing fluid further includes second proppant particles that do not include petroleum coke, and where the method includes introducing the fracturing fluid including the oil-wet petroleum coke proppant particles and the second proppant particles into the subterranean formation during a pad phase of a hydraulic fracturing operation, as well as throughout a remainder of the hydraulic fracturing operation.

While the embodiments described herein are well-calculated to achieve the advantages set forth, it will be appreciated that such embodiments are susceptible to modification, variation, and change without departing from the spirit thereof. In other words, the particular embodiments described herein are illustrative only, as the teachings of the present disclosure may be modified and practiced in different but equivalent manners apparent to those skilled in the art having the benefit of the teachings herein. Moreover, the systems and methods illustratively disclosed herein may suitably be practiced in the absence of any element that is not specifically disclosed herein and/or any optional element disclosed herein. While compositions and methods are described in terms of "comprising" or "including" various components or steps, the compositions and methods can also "consist essentially of" or "consist of" the various components and steps. Indeed, the present disclosure includes all alternatives, modifications, and equivalents falling within the true spirit and scope of the appended claims.

What is claimed is:

1. A method for producing hydrocarbon fluids via a hydrocarbon well, comprising:

providing petroleum coke proppant particles;

performing at least one wettability alteration treatment on the petroleum coke proppant particles, the at least one wettability alteration treatment comprising reacting the petroleum coke proppant particles with an organosilane to generate modified petroleum coke proppant particles having an Amott index for oil of at least 0.02, an Amott index for water of at most 0.1, and a pseudo Amott index of at most 0.35;

for each of a plurality of stages of a hydrocarbon well, introducing a fracturing fluid comprising a carrier fluid and the modified petroleum coke proppant particles into a subterranean formation via a wellbore of the hydrocarbon well; and producing hydrocarbon fluids from the subterranean formation via the wellbore of the hydrocarbon well.

2. The method of claim 1, wherein a water-oil ratio of the hydrocarbon fluids is decreased by at least 5% as compared to an expected water-oil ratio of the hydrocarbon fluids if the fracturing fluid did not comprise the modified petroleum coke proppant particles.

3. The method of claim 1, wherein during a generation of the modified petroleum coke proppant particles within a reactor, decreasing a temperature in the reactor by 5° C. to 15° C. to strip at least a portion of light hydrocarbons from the petroleum coke proppant particles.

4. The method of claim 1, wherein performing the at least one wettability alteration treatment on the modified petroleum coke proppant particles comprises coating the modified petroleum coke proppant particles with a wax.

5. The method of claim 4, wherein the wax comprises a paraffin wax, a polyethylene (PE) wax, or both.

6. The method of claim 1, wherein performing the at least one wettability alteration treatment on the petroleum coke proppant particles further comprises thermally post-treating the petroleum coke proppant particles at a temperature in a range from 400° C. to 1200° C. for a duration in a range from 8 hours to 24 hours.

7. The method of claim 1, further comprising thermally post-treating the petroleum coke proppant particles at a temperature in a range from 400° C. to 1200° C. for a duration in a range from 1 minute to 24 hours.

8. The method of claim 6, wherein the organosilane comprises trichlorosilane with a normal alkyl group 6 to 12 carbons long, trimethoxysilane with a normal alkyl group 6 to 12 carbons long, triethoxysilane with a normal alkyl group 6 to 12 carbons long, or combinations thereof.

9. The method of claim 1, wherein the modified petroleum coke proppant particles comprise fluid coke, flexicoke, delayed coke, thermally post-treated coke, pyrolysis coke, or combinations thereof.

10. The method of claim 1, wherein the modified petroleum coke proppant particles comprise modified petroleum coke fines.

11. The method of claim 1, comprising, for each of the plurality of stages, introducing the fracturing fluid into the subterranean formation during at least a portion of a pad phase of a hydraulic fracturing operation, prior to an introduction of a second fracturing fluid comprising the carrier fluid and second proppant particles that do not comprise the modified petroleum coke into the subterranean formation.

12. The method of claim 11, wherein the second proppant particles comprise at least one of sand and coal-derived coke particles.

13. The method of claim 1, wherein the fracturing fluid further comprises second proppant particles that do not comprise petroleum coke, and wherein the method comprises, for each of the plurality of stages, introducing the fracturing fluid comprising the modified petroleum coke proppant particles and the second proppant particles into the subterranean formation during at least a portion of a pad phase of a hydraulic fracturing operation, as well as during at least a portion of a remainder of the hydraulic fracturing operation.

14. The method of claim 13, wherein the second proppant particles comprise at least one of sand and coal-derived coke particles.

15. The method of claim 1, wherein the carrier fluid comprises water.

16. The method of claim 1, wherein the carrier fluid is substantially free of water.

17. The method of claim 1, wherein providing the petroleum coke proppant particles comprise utilizing petroleum coke fines of bulk petroleum coke granules for the petroleum coke proppant particles.

18. The method of claim 17, wherein the bulk petroleum coke granules comprises sieved fluid coke, sieved flexicoke, sieved delayed coke, sieved thermally post-treated coke, sieved pyrolysis coke, ground fluid coke, ground flexicoke, ground delayed coke, ground thermally post-treated coke, ground pyrolysis coke, or combinations thereof.

19. The method of claim 1, wherein the organosilane comprises at least one of trichlorosilane with a normal alkyl group 6 to 12 carbons long.

20. A method for making modified coke proppant particles, comprising:
performing at least one wettability alteration treatment on petroleum coke proppant particles by:
(i) reacting the petroleum coke proppant particles with an organosilane; and
(ii) thermally post-treating the petroleum coke proppant particles at a temperature in a range from 400° C. to 1200° C. for a duration in a range from 8 hours to 24 hours to generate modified petroleum coke proppant particles.

21. The method of claim 20, wherein the modified proppant particles have an Amott index for oil of at least 0.02, an Amott index for water of at most 0.1, and a pseudo Amott index of at most 0.35.

22. The method of claim 20, wherein the organosilane comprises at least one of trichlorosilane with a normal alkyl group 6 to 12 carbons long.

23. The method of claim 20, further comprising decreasing a temperature in a a reactor by 5° C. to 15° C. to strip at least a portion of light hydrocarbons from the petroleum coke proppant particles.

24. The method of claim 20, wherein the modified petroleum coke proppant particles comprise fluid coke, flexicoke, delayed coke, thermally post-treated coke, pyrolysis coke, or combinations thereof.

25. A method for producing hydrocarbon fluids via a hydrocarbon well, comprising:
providing petroleum coke proppant particles;
performing at least one wettability alteration treatment on the petroleum coke proppant particles, the wettability alteration treatment comprising reacting the petroleum coke proppant particles with an organosilane and thermally post-treating the petroleum coke proppant particles at a temperature in a range from 400° C. to 1200° C. for a duration in a range from 8 hours to 24 hours to generate modified petroleum coke proppant particles;
for each of a plurality of stages of a hydrocarbon well, introducing a fracturing fluid comprising a carrier fluid and the modified petroleum coke proppant particles into a subterranean formation via a wellbore of the hydrocarbon well; and
producing hydrocarbon fluids from the subterranean formation via the wellbore of the hydrocarbon well.

* * * * *